(12) United States Patent
Kendall et al.

(10) Patent No.: US 10,766,212 B2
(45) Date of Patent: Sep. 8, 2020

(54) METHOD AND APPARATUS FOR FORMING RADIUS FILLER KITS

(71) Applicant: The Boeing Company, Chicago, IL (US)

(72) Inventors: James R. Kendall, Mount Pleasant, SC (US); Paul D. Shaw, Charleston, SC (US); Raviendra Sidath Suriyaarachchi, Daniel Island, SC (US); Sadie Lee Fieni, Charleston, SC (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 15/840,793

(22) Filed: Dec. 13, 2017

(65) Prior Publication Data

US 2019/0176414 A1    Jun. 13, 2019

(51) Int. Cl.
*B29C 70/74* (2006.01)
*B29C 70/34* (2006.01)
*B29L 31/30* (2006.01)

(52) U.S. Cl.
CPC .......... *B29C 70/745* (2013.01); *B29C 70/342* (2013.01); *B29L 2031/3082* (2013.01)

(58) Field of Classification Search
CPC ... B29C 70/745; B29C 70/342; B29C 70/475; B29L 2031/3082
See application file for complete search history.

(56) References Cited

U.S. PATENT DOCUMENTS

| 8,333,864 | B2 | 12/2012 | Brennan et al. |
| 9,637,354 | B2 * | 5/2017 | Forston .................... B66C 1/28 |
| 2012/0121866 | A1 | 5/2012 | Hawkins et al. |
| 2016/0075092 | A1 * | 3/2016 | Wilcoxson ............. B64C 1/064 156/222 |
| 2016/0107432 | A1 * | 4/2016 | Krajca ............... B29D 99/0014 156/250 |
| 2019/0009477 | A1 * | 1/2019 | Gordon ............. B29D 99/0003 |

* cited by examiner

*Primary Examiner* — Vishal I Patel
(74) *Attorney, Agent, or Firm* — Yee & Associates, P.C.

(57) ABSTRACT

A plurality of segments of radius filler is positioned onto a radius filler forming tool. The plurality of segments of radius filler is applied to a stringer in a single placement step.

37 Claims, 15 Drawing Sheets

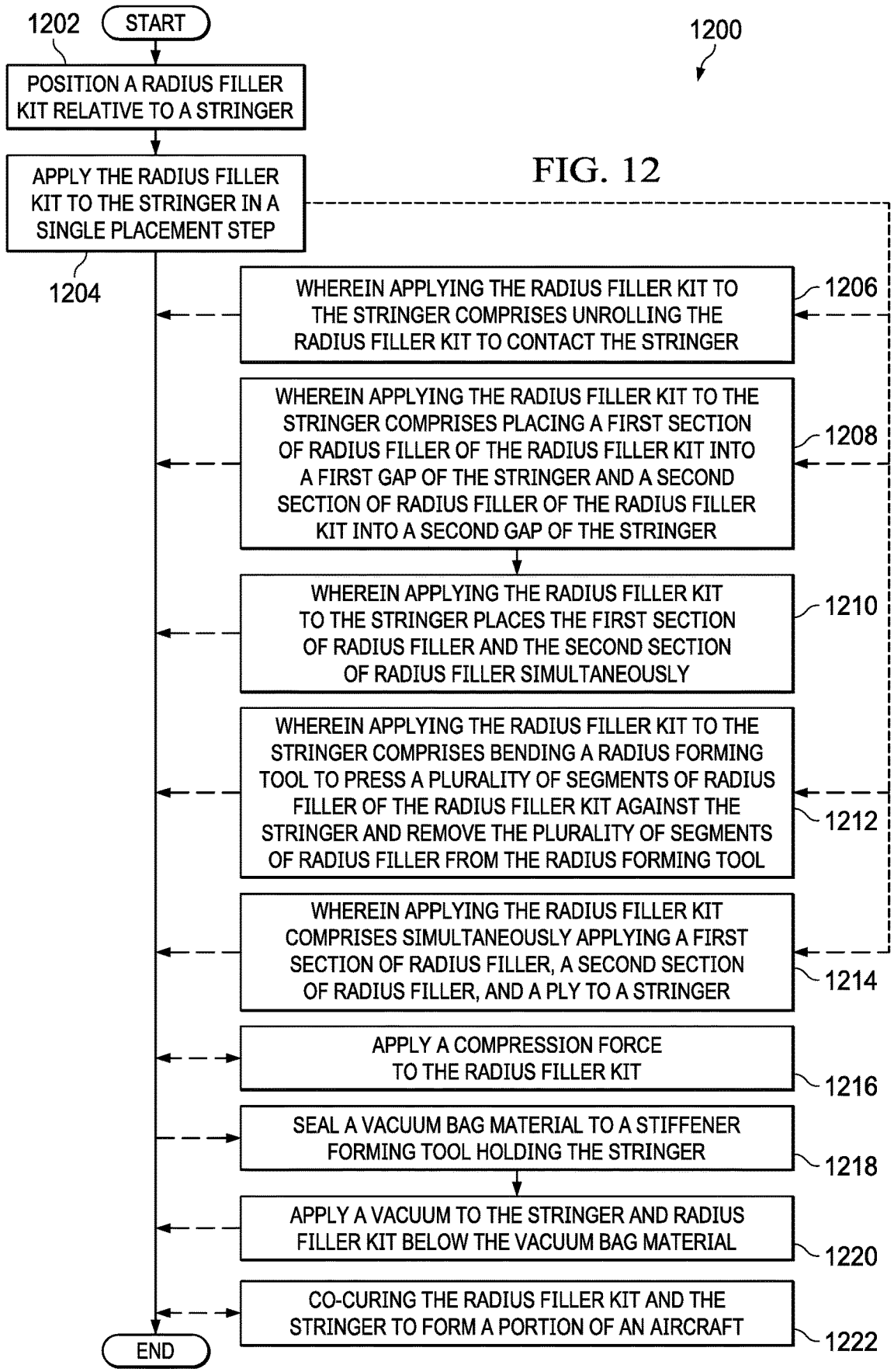

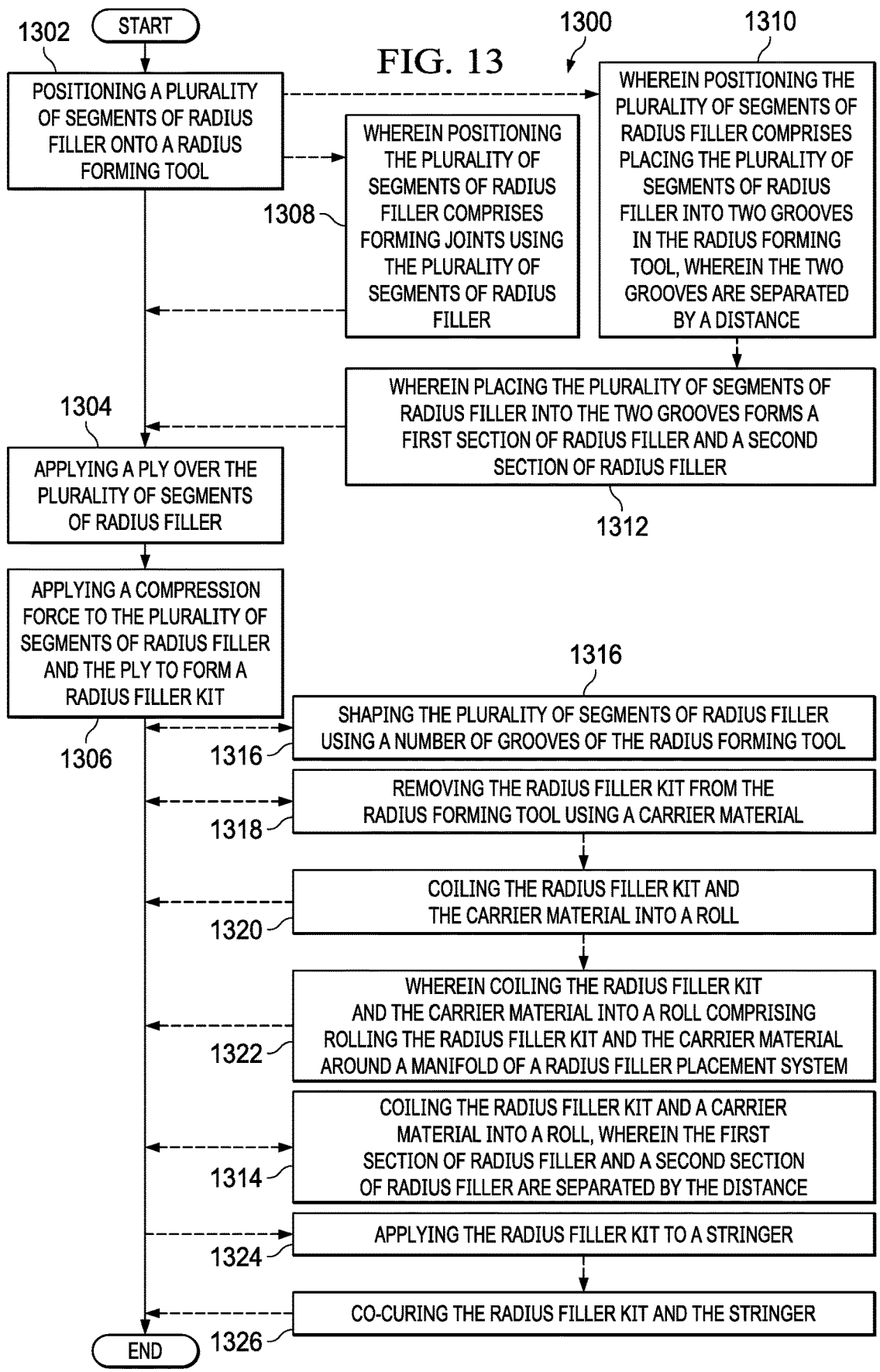

METHOD AND APPARATUS FOR FORMING RADIUS FILLER KITS

BACKGROUND INFORMATION

1. Field

The present disclosure relates generally to laying up radius fillers and, more specifically, to laying up radius fillers substantially simultaneously. Yet more specifically, the present disclosure relates to forming radius filler kits for application to a composite layup.

2. Background

Radius fillers, also called "noodles," are used to fill interfaces between plies in composite joints. Radius fillers are commonly used in joints for stiffeners, such as stringers. The radius being filled is created when a composite layup with a particular radius is joined with another composite layup.

Currently, radius fillers are applied to a composite layup directly by hand. Currently, radius fillers are applied individually to the composite layup. Applying radius fillers by hand may take more time than desired. Additionally, applying radius fillers by hand may be a less than desirable use of man power.

Therefore, it would be desirable to have a method and apparatus that take into account at least some of the issues discussed above, as well as other possible issues.

SUMMARY

An illustrative embodiment of the present disclosure provides a method. A plurality of segments of radius filler is positioned onto a radius filler forming tool. The plurality of segments of radius filler is applied to a stringer in a single placement step.

Another illustrative embodiment of the present disclosure provides a method. A radius filler kit is positioned relative to a stringer. The radius filler kit is applied to the stringer in a single placement step.

A further illustrative embodiment of the present disclosure provides a method. A plurality of segments of radius filler is positioned onto a radius filler forming tool. A ply is applied over the plurality of segments of radius filler. A compression force is applied to the plurality of segments of radius filler and the ply to form a radius filler kit.

A yet further illustrative embodiment of the present disclosure provides an apparatus. The apparatus comprises a roller manifold having a vacuum opening and a vacuum bag material connected to the roller manifold. The vacuum bag has an opening interfacing with the vacuum opening.

A yet further illustrative embodiment of the present disclosure provides a radius filler forming tool. The radius filler forming tool comprises a number of grooves in a surface and vacuum channels in the surface surrounding the number of grooves.

Another illustrative embodiment of the present disclosure provides an apparatus. The apparatus comprises a radius filler kit and a carrier material. The radius filler kit is on the carrier material. The radius filler kit comprises a plurality of segments of radius filler.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 12 is an illustration of a flowchart of a method for using a radius filler kit in accordance with an illustrative embodiment;

FIG. 13 is an illustration of a flowchart of a method for forming a radius filler kit in accordance with an illustrative embodiment;

DETAILED DESCRIPTION

Figure 1:
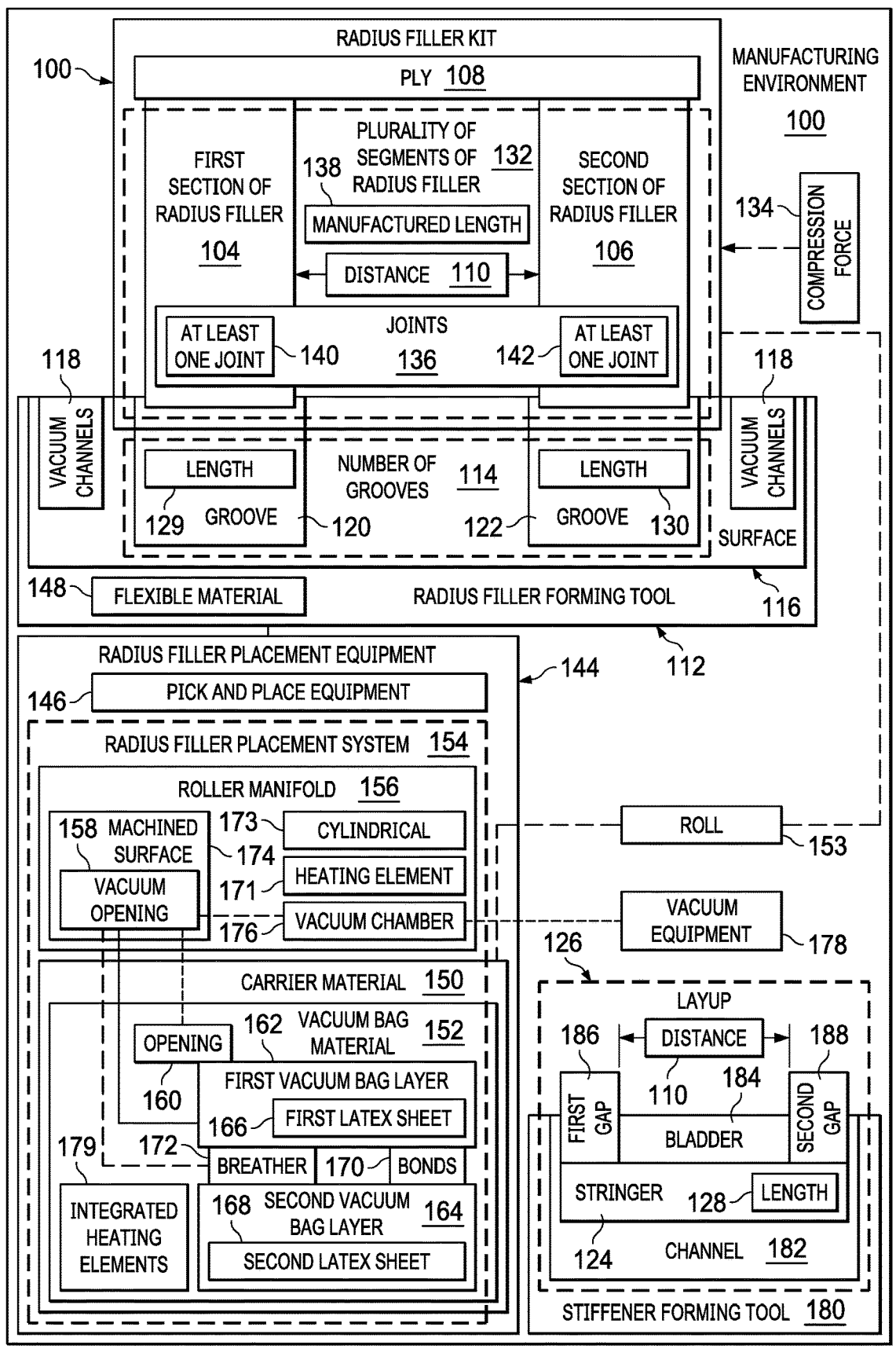
FIG. 1 is an illustration of a block diagram of a manufacturing environment in which radius fillers are laid up in accordance with an illustrative embodiment.

The illustrative embodiments recognize and take into account one or more different considerations. For example, the illustrative embodiments recognize and take into account that composite materials are tough, light-weight materials created by combining two or more functional components.

The illustrative embodiments recognize and take into account that a composite material may include reinforcing fibers bound in a polymer resin matrix. The illustrative embodiments recognize and take into account that the fibers may be unidirectional or may take the form of a woven cloth or fabric. The illustrative embodiments recognize and take into account that the fibers and resins are arranged and cured to form a composite material.

The illustrative embodiments recognize and take into account that using composite materials to create aerospace composite structures potentially allows for portions of an aircraft to be manufactured in larger pieces or sections. The illustrative embodiments recognize and take into account that a fuselage in an aircraft may be created in cylindrical sections and then assembled to form the fuselage of the aircraft.

The illustrative embodiments recognize and take into account that in some manufacturing processes for large composite parts, composite materials are laid up on a single large tool. The illustrative embodiments recognize and take into account that the large tool may be a manufacturing time limiting component.

The illustrative embodiments recognize and take into account that radius fillers (noodles) are currently hand installed into the cavities between stringer bladders and web/flange radii. The illustrative embodiments recognize and take into account that a ply, sometimes referred to as an inner mold line (IML) ply, is applied in a separate application step. The illustrative embodiments recognize and take into account that the ply is applied after a compaction step for the radii fillers. The illustrative embodiments recognize and take into account that an additional compaction step is performed for the ply after applying the ply over the radius filler.

The illustrative embodiments recognize and take into account that each application step on a tool adds flow to the assembly work on the tool. The illustrative embodiments recognize and take into account that each stringer includes radiuses that that are desirably filled. The illustrative embodiments recognize and take into account that applying each radius filler by hand may take an undesirable amount of time.

The illustrative embodiments recognize and take into account that laying radius fillers by hand onto the part may result in inconsistencies. The illustrative embodiments recognize and take into account that the inconsistencies may be introduced by placing unformed noodles into the gaps between a bladder and a stringer.

The illustrative embodiments recognize and take into account that radius fillers (noodles) are currently hand installed into the cavity in manageable (~6 ft) increments and then butted. The illustrative embodiments recognize and take into account that this radius filler application process is performed down the length of each stringer twice (one for each side of the stringer). The illustrative embodiments recognize and take into account that the manual radius filler application process may lead to an undesirable amount of on-part inspection (butt/gap requirements). The illustrative embodiments recognize and take into account that the manual radius filler application process adds flow time to the part on the tool.

Referring now to the figures and, in particular, with reference to FIG. 1, an illustration of a block diagram of a manufacturing environment in which radius fillers are laid up is depicted in accordance with an illustrative embodiment. In this figure, radius filler kit 100 is formed in manufacturing environment 102.

As depicted, radius filler kit 100 comprises first section of radius filler 104, second section of radius filler 106, and ply 108. First section of radius filler 104 and second section of radius filler 106 are separated by distance 110. In some illustrative examples, ply 108 is optional.

Distance 110 may be any desirable distance. In some illustrative examples, distance 110 is a single value across the length of first section of radius filler 104 and second section of radius filler 106. In other illustrative examples, distance 110 includes more than one value along the length of first section of radius filler 104 and second section of radius filler 106. In some illustrative examples, distance 110 may increase or decrease along the length of first section of radius filler 104 and second section of radius filler 106. When an increase or decrease is not present, distance 110 includes one value. When an increase or decrease is present, distance 110 includes two or more values.

The components of radius filler kit 100 are formed of a composite material. For example, each of first section of radius filler 104, second section of radius filler 106, and ply 108 may be formed of composite materials. Radius filler kit 100 may be formed of a thermoplastic composite material or a thermoset composite material.

Radius filler forming tool 112 is used to form radius filler kit 100. Radius filler forming tool 112 has number of grooves 114 in surface 116. As used herein, a "number of" items is one or more items. Here, "number of grooves 114" is one or more grooves. Vacuum channels 118 in surface 116 surround number of grooves 114. As depicted, number of grooves 114 includes groove 120 and groove 122.

Each of number of grooves 114 is configured to form a section of radius filler with a length equivalent to a length of a stringer in a layup. As depicted, radius filler forming tool 112 is used to form radius filler kit 100 for stringer 124 in layup 126. In some illustrative examples, each of number of grooves 114 has a length equivalent to length 128 of stringer 124 in layup 126. In one illustrative example, groove 120 has length 129 equivalent to length 128 and groove 122 has length 130 equivalent to length 128.

In some illustrative examples, groove 120 has length 129 greater than length 128, and groove 122 has length 130 greater than length 128. In these illustrative examples, groove 120 and groove 122 are used to form sections of radius filler each having length 128.

In some illustrative examples, length 129 and length 130 are substantially the same. In other illustrative examples, length 129 and length 130 may have different values.

To form radius filler kit 100, plurality of segments of radius filler 132 is positioned onto radius filler forming tool 112. Ply 108 is applied over plurality of segments of radius filler 132. Compression force 134 is applied to plurality of segments of radius filler 132 and ply 108 to form radius filler kit 100.

In illustrative examples in which ply 108 is not present in radius filler kit 100, compression force 134 is applied to plurality of segments of radius filler 132 after positioning plurality of segments of radius filler 132 onto radius filler forming tool 112.

When length 128 is greater than a provided manufactured length of radius filler, positioning plurality of segments of radius filler 132 includes forming joints 136 using plurality of segments of radius filler 132. For example, radius filler is provided in manufactured lengths. When manufactured length 138 of plurality of segments of radius filler 132 is shorter than length 128, first section of radius filler 104 will include at least one joint 140. In this illustrative example, at least one joint 140 is part of joints 136. When manufactured length 138 of plurality of segments of radius filler 132 is shorter than length 128, second section of radius filler 106 will include at least one joint 142. In this illustrative example, at least one joint 142 is part of joints 136.

Joints 136 take any desirable form. In some illustrative examples, joints 136 are butt joints. However, joints 136 may instead be any of at least one of a lap joint, a scarf joint, a step lap joint, or any other desirable type of joint.

Radius filler placement equipment 144 applies radius filler kit 100 to stringer 124. Radius filler placement equipment 144 takes any desirable form. Radius filler placement equipment 144 may be operated manually, in an automated fashion, or some combination of the two. Radius filler placement equipment 144 performs at least one of lifting radius filler kit 100 from radius filler forming tool 112, storing radius filler kit 100, positioning radius filler kit 100 relative to stringer 124, and applying radius filler kit 100 to stringer 124.

In some illustrative examples, radius filler placement equipment 144 is pick and place equipment 146. When radius filler placement equipment 144 is pick and place equipment 146, pick and place equipment 146 may be operated manually, in an automated fashion, or some combination of the two. In these illustrative examples, pick and place equipment 146 lifts radius filler kit 100 from radius filler forming tool 112 and places radius filler kit 100 onto stringer 124. When pick and place equipment 146 is used to lift and place radius filler kit 100, additional equipment may be present in manufacturing environment 102 to apply compression force 134 to form radius filler kit 100.

In other illustrative examples, radius filler placement equipment 144 is radius filler forming tool 112. When radius filler placement equipment 144 is radius filler forming tool 112, radius filler forming tool 112 comprises flexible material 148. In some illustrative examples, flexible material 148 is flexible about a line (not depicted) perpendicular to number of grooves 114 in surface 116.

When radius filler forming tool 112 has flexible material 148, radius filler forming tool 112 may be bent to apply radius filler kit 100 to stringer 124 and remove radius filler kit 100 from radius filler forming tool 112 substantially simultaneously. For example, compression is applied to at least a portion of radius filler forming tool 112 to press radius filler kit 100 to stringer 124. After applying compression, radius filler forming tool 112 is bent away from stringer 124 to "peel" radius filler forming tool 112 from radius filler kit 100.

In other illustrative examples, radius filler placement equipment 144 takes the form of carrier material 150. In some illustrative examples, carrier material 150 may be a component of radius filler placement equipment 144. Carrier material 150 may be used manually, in conjunction with automated or partially automated equipment, or some combination of the two. Carrier material 150 is formed of any desirable material configured to lift radius filler kit 100 and apply radius filler kit 100 to stringer 124. In some illustrative examples, carrier material 150 is selected to be reusable. In some illustrative examples, carrier material 150 lifts and applies radius filler kit 100 using a mechanical compressive force.

In other illustrative examples, carrier material 150 takes the form of vacuum bag material 152. When carrier material 150 takes the form of vacuum bag material 152, a vacuum (not depicted) may be pulled underneath carrier material 150 to lift and apply radius filler kit 100. Vacuum bag material 152 is formed of any desirable material configured to hold a vacuum, lift radius filler kit 100, and apply radius filler kit 100 to stringer 124. In some illustrative examples, vacuum bag material 152 is selected to be reusable.

In some illustrative examples, vacuum bag material 152 is configured to lift a composite material. The composite material may take any desirable form. In some illustrative examples, the composite material includes a ply, such as ply 108 of FIG. 1. In some illustrative examples, the composite material includes a plurality of segments of radius filler 132 of FIG. 1. In some illustrative examples, the composite material includes radius filler kit 100 of FIG. 1.

In some illustrative examples, carrier material 150 and radius filler kit 100 may be transported substantially planar. For example, carrier material 150 and radius filler kit 100 may be transported on a conveyor or on a table. In some illustrative examples, carrier material 150 and radius filler kit 100 are coiled into roll 153.

In some illustrative examples, carrier material 150 is a component of radius filler placement system 154. Radius filler placement system 154 may be used manually, in an automated fashion, or some combination of the two. Radius filler placement system 154 comprises roller manifold 156 having vacuum opening 158 and vacuum bag material 152 connected to roller manifold 156. Vacuum bag material 152 has opening 160 interfacing with vacuum opening 158.

In some illustrative examples, vacuum bag material 152 comprises first vacuum bag layer 162 and second vacuum bag layer 164. First vacuum bag layer 162 creates a vacuum seal with radius filler forming tool 112. Second vacuum bag layer 164 lifts and holds radius filler kit 100. First vacuum bag layer 162 and second vacuum bag layer 164 are formed of any desirable type of material. In some illustrative examples, first vacuum bag layer 162 and second vacuum bag layer 164 are formed of the same type of material. In other illustrative examples, first vacuum bag layer 162 and second vacuum bag layer 164 are formed of different materials.

In some illustrative examples vacuum bag material 152 comprises first latex sheet 166. First latex sheet 166 may be an implementation of first vacuum bag layer 162. In some illustrative examples, vacuum bag material 152 further comprises second latex sheet 168. Second latex sheet 168 may be an implementation of second vacuum bag layer 164.

In some illustrative examples, second latex sheet 168 is bonded to first latex sheet 166. Second latex sheet 168 is bonded to first latex sheet 166 using any desirable method. Bonds 170 between first latex sheet 166 and second latex sheet 168 may be formed using epoxy, fasteners, welding, or any other desirable method.

As depicted, breather 172 is positioned between first latex sheet 166 and second latex sheet 168. Breather 172 is in vacuum communication with vacuum opening 158. Breather 172 distributes vacuum from vacuum opening 158 to edges of first latex sheet 166 to seal first latex sheet 166 against a tool or layup, such as radius filler forming tool 112 or layup 126.

In some illustrative examples, first latex sheet 166 and second latex sheet 168 are configured to roll around roller manifold 156. First latex sheet 166 and second latex sheet 168 are configured to form roll 153 with radius filler kit 100. In these illustrative examples, first latex sheet 166 and second latex sheet 168 are configured to prevent undesirable sticking to roller manifold 156 or radius filler kit 100.

In some illustrative examples, first latex sheet 166 and second latex sheet 168 each have a respective mesh surface. The respective mesh surface prevents undesirable sticking. For example, a respective mesh surface of first latex sheet 166 prevents first latex sheet 166 from undesirably sticking to roller manifold 156 or radius filler kit 100. As another example, a respective mesh surface of second latex sheet 168 prevents second latex sheet 168 from undesirably sticking to first latex sheet 166.

Roller manifold 156 has any desirable size and shape. In some illustrative examples, roller manifold 156 is cylindrical 173.

In some illustrative examples, roller manifold 156 has machined surface 174. When machined surface 174 is present, vacuum bag material 152 is connected to machined surface 174. For example, first vacuum bag layer 162 is connected to machined surface 174. Machined surface 174 creates a larger surface area for connecting vacuum bag material 152 to roller manifold 156.

When roller manifold 156 has machined surface 174, vacuum opening 158 is within machined surface 174. Machined surface 174 aids in orienting vacuum opening 158 relative to radius filling forming tool 112 or layup 126.

Roller manifold 156 forms vacuum chamber 176. Vacuum equipment 178 provides vacuum to vacuum chamber 176 of roller manifold 156. Vacuum travels from vacuum chamber 176 through vacuum opening 158 and opening 160 to beneath first vacuum bag layer 162.

Vacuum beneath first vacuum bag layer 162 seals first vacuum bag layer 162 to one of radius filler kit 100 or layup 126. Vacuum beneath first vacuum bag layer 162 applies compression force 134 to radius filler kit 100 on radius filler forming tool 112.

In some illustrative examples, a heating element is associated with radius filler placement system 154. A heating element may be used to heat composite material of radius filler kit 100. Heating radius filler kit 100 affects at least one of the flexibility or the tackiness of the composite material of radius filler kit 100. At least one of flexibility or tackiness of the composite material of radius filler kit 100 affects at least one of adhesion to carrier material 150, adhesion to stringer 124, or coiling into or out of roll 153.

In some illustrative examples, roller manifold 156 has heating element 171. In other illustrative examples, vacuum bag material 152 has integrated heating elements 179.

Radius filler placement system 154 may be used as a carrier, a roller, a backing paper, and a compaction bag. Radius filler placement system 154 lifts radius filler kit 100 to act as a carrier. In some illustrative examples, carrier material 150 and radius filler kit 100 form roll 153 and radius filler placement system 154 acts as a roller. Radius filler placement system 154 acts as a backing paper to apply radius filler kit 100 to stringer 124 of layup 126.

Layup 126 is formed on stiffener forming tool 180. Stringer 124 is positioned in channel 182 of stiffener forming tool 180. Bladder 184 is positioned in stringer 124 to maintain the shape of stringer 124.

Radius filler placement equipment 144 applies plurality of segments of radius filler 132 to stringer 124. Radius filler placement equipment 144 applies plurality of segments of radius filler 132 to first gap 186 and second gap 188 of stringer 124. First gap 186 and second gap 188 are separated by distance 110.

As depicted, applying plurality of segments of radius filler 132 to first gap 186 and second gap 188 comprises applying plurality of segments of radius filler 132 to first gap 186 and second gap 188 simultaneously. In some illustrative examples, applying radius filler kit 100 to stringer 124 comprises placing first section of radius filler 104 of radius filler kit 100 into first gap 186 of stringer 124 and second section of radius filler 106 of radius filler kit 100 into second gap 188 of stringer 124.

In some illustrative examples, radius filler placement system 154 acts as backing paper to position and apply radius filler kit 100 to stringer 124. After applying radius filler kit 100 to stringer 124, radius filler placement system 154 acts as a compaction bag to apply pressure to radius filler kit 100.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The illustration of manufacturing environment 102 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although radius filler placement system 154 is described for use with radius filler kit 100, radius filler placement system 154 may be used to place any desirable type of composite material. For example, radius filler placement system 154 may instead be referred to as a composite placement system or composite placement apparatus. In some illustrative examples, radius filler placement system 154 may be used to position and place plies of composite material (not depicted). In some illustrative examples, radius filler placement system 154 may be used to coil and store plies of composite material (not depicted).

Figure 2:
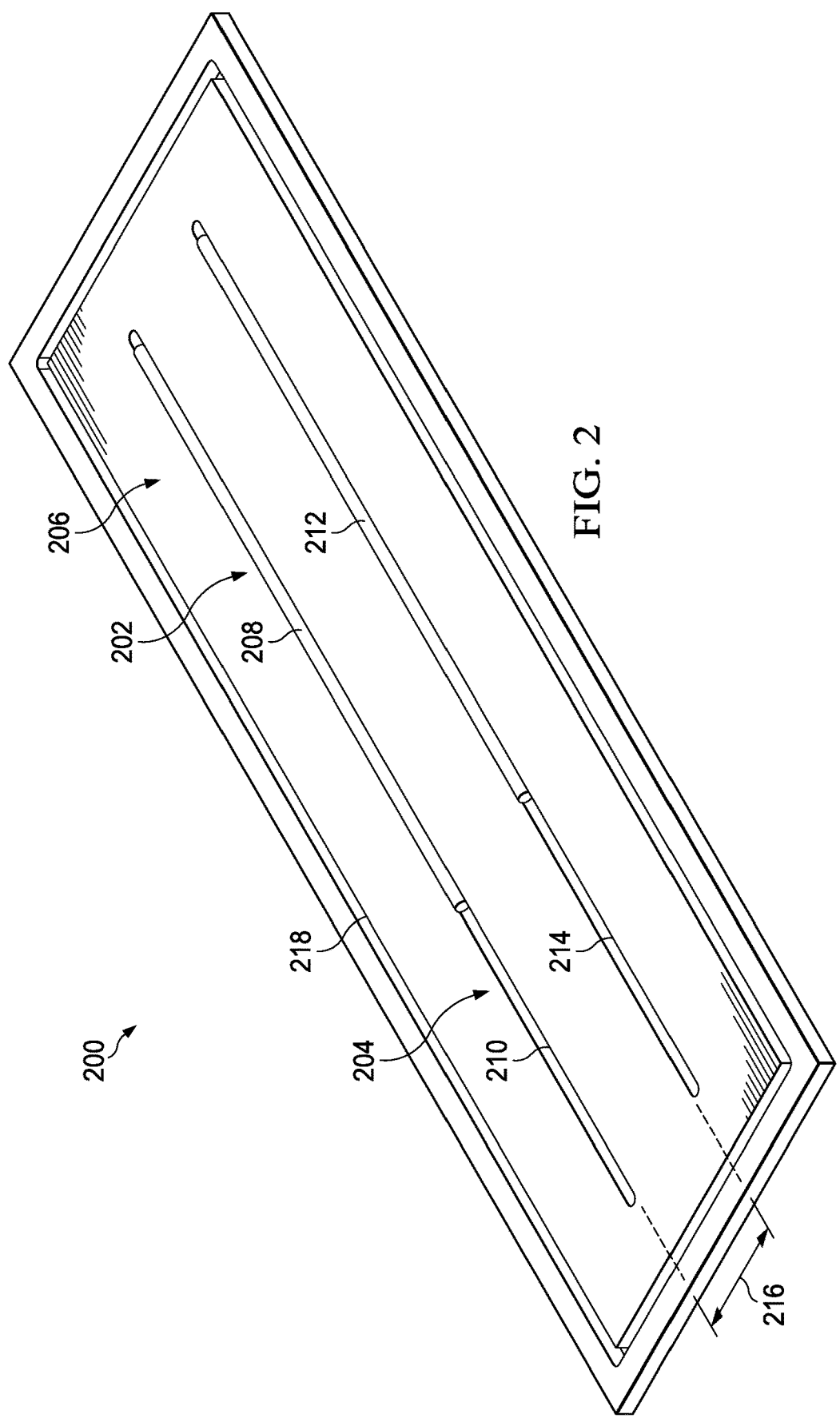
FIG. 2 is an illustration of a perspective view of radius fillers on a radius filler forming tool in accordance with an illustrative embodiment.

Turning now to FIG. 2, an illustration of a perspective view of radius fillers on a radius filler forming tool is depicted in accordance with an illustrative embodiment. Radius filler forming tool 200 is a physical implementation of radius filler forming tool 112 of FIG. 1. Plurality of segments of radius filler 202 has been positioned onto radius filler forming tool 200. Plurality of segments of radius filler 202 is a physical implementation of plurality of segments of radius filler 132 of FIG. 1.

In this illustrative example, plurality of segments of radius filler 202 has been placed into number of grooves 204 in surface 206 of radius filler forming tool 200. As depicted, plurality of segments of radius filler 202 include radius filler 208 placed into groove 210 of number of grooves 204 and radius filler 212 placed into groove 214 of number of grooves 204.

Groove 210 and groove 214 are separated by distance 216. As depicted, radius filler 208 and radius filler 212 are separated by distance 216. Distance 216 is equivalent to a distance between a first gap and a second gap of a stringer, such as stringer 402 of FIG. 4 or stringer 602 of FIG. 6. As depicted, distance 216 has a constant or substantially constant value. However, in other non-depicted illustrative examples, distance 216 has multiple values. When distance 216 has multiple values, radius filler 208 and radius filler 212 are not parallel.

In some illustrative examples, number of grooves 204 in surface 206 is configured to shape plurality of segments of radius filler 202. In one illustrative example, number of grooves 204 in surface 206 is configured to shape plurality of segments of radius filler 202 to a domed cross-sectional shape. In another illustrative example, number of grooves 204 in surface 206 is configured to shape plurality of segments of radius filler 202 to a triangular cross-sectional shape. Number of grooves 204 in surface 206 may shape plurality of segments of radius filler 202 when compressive force is applied to plurality of segments of radius filler 202.

Vacuum channels 218 in surface 206 surround number of grooves 204. Vacuum channels 218 are used to form a seal around number of grooves 204 to apply vacuum to plurality of segments of radius filler 202.

Figure 3:
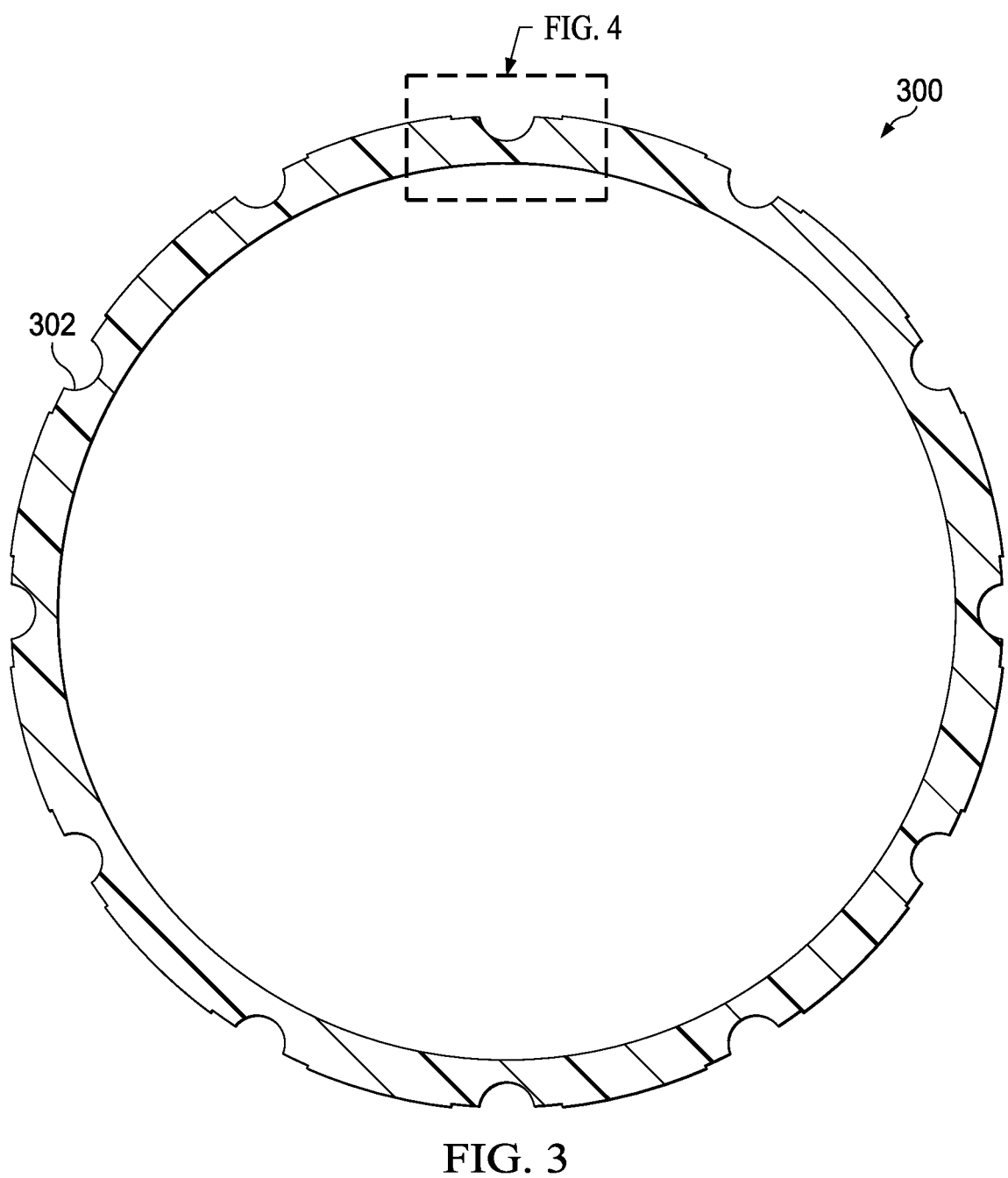
FIG. 3 is an illustration of a cross-sectional view of a stiffener forming tool for positioning stringers for a layup in accordance with an illustrative embodiment.

Turning now to FIG. 3, an illustration of a cross-sectional view of a stiffener forming tool for positioning stringers for a layup is depicted in accordance with an illustrative embodiment. Stiffener forming tool 300 is a physical implementation of stiffener forming tool 180 of FIG. 1. As depicted, stiffener forming tool 300 has plurality of channels 302.

A stringer is laid up in each of plurality of channels 302. After laying up a stringer in a respective channel of plurality of channels 302, radius fillers are applied to gaps of the respective stringer.

Laying up stringers and radius fillers in each of plurality of channels 302 of stiffener forming tool 300 by hand is a time-limiting step. Applying radius fillers as a radius filler kit will reduce the time spent applying radius fillers to stiffener forming tool 300. For example, applying plurality of segments of radius filler 132 of FIG. 1 as radius filler kit 100 to stiffener forming tool 300 will reduce the time spent applying plurality of radius filler 132 to stiffener forming tool 300.

The illustration of stiffener forming tool 300 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although stiffener forming tool 300 has a circular cross-section, a stiffener forming tool may have any desirable shape. As another example, although stiffener forming tool 300 has channels 302, a stiffener forming tool may have any desirable size, quantity, or shape of channels.

Figure 4:
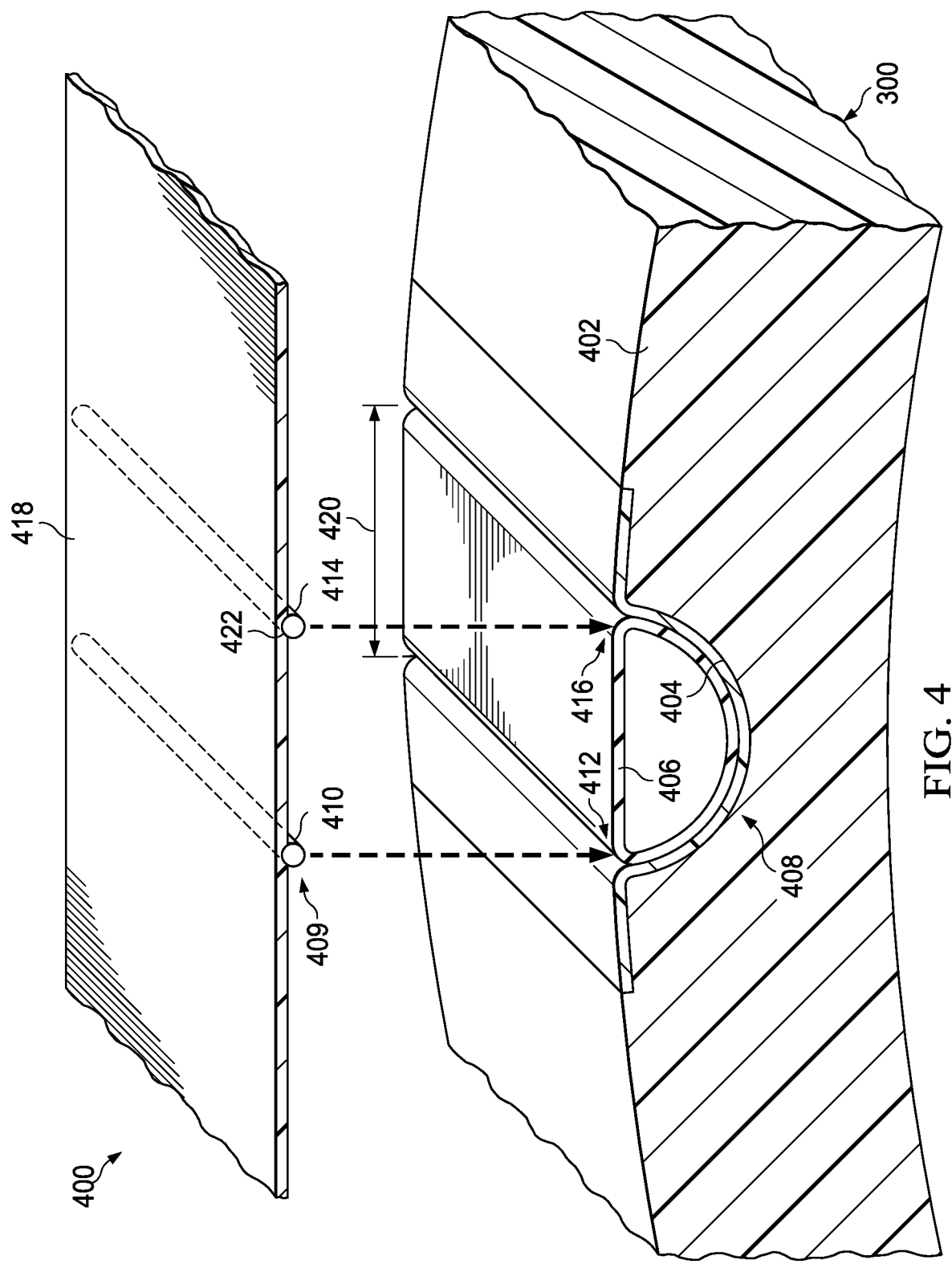
FIG. 4 is an illustration of a perspective view of a radius filler kit being positioned relative to a stringer in accordance with an illustrative embodiment.

Turning now to FIG. 4, an illustration of a perspective view of a radius filler kit being positioned relative to a stringer is depicted in accordance with an illustrative embodiment. In FIG. 4, stringer 402 has been placed in one of plurality of channels 302 of stiffener forming tool 300 of FIG. 3. More specifically, stringer 402 is within channel 404 of stiffener forming tool 300. Radius filler kit 400 is a physical implementation of radius filler kit 100 of FIG. 1. Radius filler kit 400 is positioned relative to stringer 402. Stringer 402 is a physical implementation of stringer 124 of FIG. 1.

Bladder 406 is positioned within stringer 402. Bladder 406 maintains shape 408 of stringer 402 during curing.

Radius filler kit 400 is positioned relative to stringer 402. Radius filler kit 400 comprises plurality of segments of radius filler 409. Plurality of segments of radius filler 409 form first section of radius filler 410 and second section of radius filler 414. Radius filler kit 400 is positioned such that first section of radius filler 410 will be placed into first gap 412 of stringer 402. Radius filler kit 400 is positioned such that second section of radius filler 414 will be placed into second gap 416 of stringer 402.

Radius filler kit 400 is applied to stringer 402 by lowering carrier material 418 towards stringer 402. Radius filler kit 400 is lowered such that plurality of segments of radius filler 409 is applied to first gap 412 and second gap 416 of stringer 402. First gap 412 and second gap 416 are separated by distance 420. First section of radius filler 410 and second section of radius filler 414 on carrier material 418 are separated by distance 420 prior to application to stringer 402.

Plurality of segments of radius filler 409 is applied to first gap 412 and second gap 416 simultaneously. Radius filler kit 400, including first section of radius filler 410 and second section of radius filler 414, is lowered such that first section of radius filler 410 is applied to first gap 412 and second section of radius filler 414 is applied to second gap 416 simultaneously.

Carrier material 418 and radius filler kit 400 are lowered towards stiffener forming tool 300 to apply radius filler kit 400 to stringer 402. In some illustrative examples, carrier material 418 holding radius filler kit 400 may be transported in a substantially planar state. In other illustrative examples, carrier material 418 holding radius filler kit 400 may be transported in a rolled state. In some illustrative examples, applying plurality of segments of radius filler 409 comprises unrolling carrier material 418 and radius filler kit 400. In other illustrative examples, carrier material 418 and radius filler kit 400 are unrolled after transportation but prior to application of radius filler kit 400 to stringer 402.

After applying radius filler kit 400 to stringer 402, a compression force is applied to create a greater adhesive force between radius filler kit 400 and stringer 402 than between radius filler kit 400 and carrier material 418. When the adhesive force between radius filler kit 400 and stringer 402 is greater than the adhesive force between radius filler kit 400 and carrier material 418, carrier material 418 may be removed from radius filler kit 400. When carrier material 418 is removed from radius filler kit 400, first section of radius filler 410 remains in first gap 412 and second section of radius filler 414 remains in second gap 416.

In some illustrative examples, carrier material 418 is a vacuum bag material. When carrier material 418 is a vacuum bag material, the vacuum bag material may be sealed to stiffener forming tool 300 holding stringer 402 after applying radius filler kit 400 to stringer 402. In these illustrative examples, a vacuum may be applied to plurality of segments of radius filler 409 and stringer 402 to apply the compression force to plurality of segments of radius filler 409. After applying the vacuum, carrier material 418 is removed.

In some illustrative examples, plurality of segments of radius filler 409 and stringer 402 may be cured prior to removing carrier material 418. In other illustrative examples, plurality of segments of radius filler 409 and stringer 402 are cured after removing carrier material 418. For example, plurality of segments of radius filler 409 and stringer 402 may be components of a larger composite layup. In this example, after positioning the other components of the larger composite layup, the composite layup is co-cured as a whole. For example, plurality of segments of radius filler 409 and stringer 402 may be components of a barrel section of an aircraft. In this illustrative example, the barrel section may be cured after a composite skin is placed over plurality of segments of radius filler 409 and stringer 402.

The illustration of radius filler kit 400, carrier material 418, and stiffener forming tool 300 in FIG. 4 are not meant to imply physical or architectural limitations to the manner in which an illustrative embodiment may be implemented. Other components in addition to or in place of the ones illustrated may be used. Some components may be unnecessary.

As discussed, channel 404 is a portion of stiffener forming tool 300. In other illustrative examples, channel 404 may be a portion of a stiffener forming tool having a different size, shape, or quantity of channels. Radius filler kit 400 is depicted as having two radius filler sections. In other illustrative examples, radius filler kit 400 may have greater than two radius filler sections.

As another example, first section of radius filler 410 and second section of radius filler 414 have domed cross-sectional shape 422. In other non-depicted illustrative examples, first section of radius filler 410 and second section of radius filler 414 may have other desirable shapes. For example, first section of radius filler 410 and second section of radius filler 414 may have a triangular cross-sectional shape.

Radius filler kit 400 may be positioned and applied to stringer 404 in any desirable fashion such as manually, in an automated fashion, or some combination of the two. For example, carrier material 418 may be maneuvered manually or using automated equipment. In some illustrative examples, a compression force is applied to radius filler kit 400 manually. In some illustrative examples, a compression force is applied to radius filler kit 400 in an automated fashion.

Figure 5:
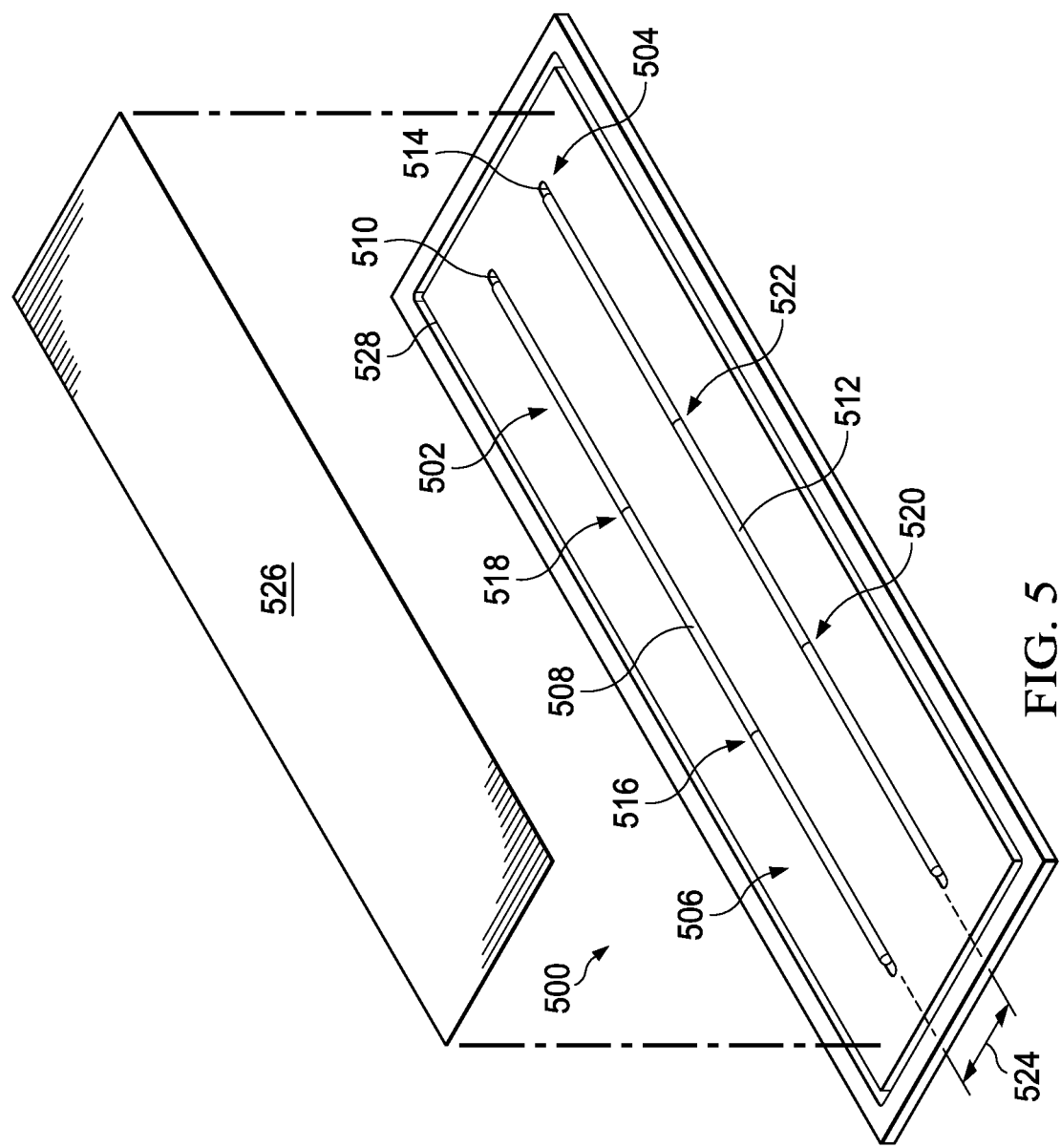
FIG. 5 is an illustration of a perspective view of radius fillers and a ply on a radius filler forming tool in accordance with an illustrative embodiment.

Turning now to FIG. 5, an illustration of a perspective view of radius fillers and a ply on a radius filler forming tool is depicted in accordance with an illustrative embodiment. Radius filler forming tool 500 is a physical implementation of radius filler forming tool 112. Plurality of segments of radius filler 502 have been positioned onto radius filler forming tool 200. Plurality of segments of radius filler 502 is a physical implementation of plurality of segments of radius filler 132 of FIG. 1.

Radius filler forming tool 500 is a physical implementation of radius filler forming tool 112 of FIG. 1. Plurality of segments of radius filler 502 have been positioned onto radius filler forming tool 500. Plurality of segments of radius filler 502 is a physical implementation of plurality of segments of radius filler 132 of FIG. 1.

In this illustrative example, plurality of segments of radius filler 502 have been placed into number of grooves 504 in surface 506 of radius filler forming tool 500. As depicted, plurality of segments of radius filler 502 include radius filler 508 placed into groove 510 of number of grooves 504 and radius filler 512 placed into groove 514 of number of grooves 504.

As depicted, radius filler 508 includes three portions of radius filler joined by joint 516 and joint 518. As depicted, radius filler 512 includes three portions of radius filler joined by joint 520 and joint 522.

Groove 510 and groove 514 are separated by distance 524. As depicted, radius filler 508 and radius filler 512 are separated by distance 524. Distance 524 is equivalent to a distance between a first gap and a second gap of a stringer, such as stringer 602 of FIG. 6. As depicted, distance 524 has a constant or substantially constant value. However, in other non-depicted illustrative examples, distance 524 has multiple values. When distance 524 has multiple values, radius filler 508 and radius filler 512 are not parallel.

In some illustrative examples, number of grooves 504 in surface 506 is configured to shape plurality of segments of radius filler 502. In one illustrative example, number of grooves 504 in surface 506 is configured to shape plurality of segments of radius filler 502 into a domed cross-sectional shape. In another illustrative example, number of grooves 504 in surface 506 is configured to shape plurality of segments of radius filler 502 into a triangular cross-sectional shape. Number of grooves 504 in surface 506 may shape plurality of segments of radius filler 502 when a compressive force is applied to plurality of segments of radius filler 502.

As depicted, ply 526 is being laid over plurality of segments of radius filler 502. After applying ply 526 over plurality of segments of radius filler 502, a compression force is applied to plurality of segments of radius filler 502 and ply 526 to form a radius filler kit. After forming the radius filler kit, the radius filler kit is applied to a stringer, such as stringer 402 of FIG. 4 or stringer 602 of FIG. 6. A compression force may be applied in any desirable way. In some illustrative examples, the compression force is a mechanical compression force. In other illustrative examples, the compression force is a pneumatic compression force, such as applying a vacuum.

In some illustrative examples, the radius filler kit, including ply 526 and plurality of segments of radius filler 502, is positioned and applied onto a stringer using radius filler forming tool 500. In these illustrative examples, radius filler forming tool 500 includes a flexible material. In these illustrative examples, the flexible material is flexible about a line perpendicular to number of grooves 504 in surface 506. In other illustrative examples with different curvatures, the flexible material may be flexible in any desired direction.

In other illustrative examples, the radius filler kit, including ply 526 and plurality of segments of radius filler 502, is removed from radius filler forming tool 500 using a carrier material (not depicted). In some illustrative examples, the carrier material is a vacuum bag material. In these illustrative examples, the vacuum bag material may be used to apply a vacuum to the radius filler kit on radius filler forming tool 500 and to apply the radius filler kit to a stringer.

Vacuum channels 528 in surface 506 surround number of grooves 504. Vacuum channels 528 are used to form a seal around number of grooves 504 to apply vacuum to ply 526 and plurality of segments of radius filler 502.

In some illustrative examples, the carrier material may be a component of a radius filler placement system, such as radius filler placement system 154 of FIG. 1. In other illustrative examples, a pick and place machine is used to remove the radius filler kit from radius filler forming tool 500 and place the radius filler kit onto a stringer.

Figure 6:
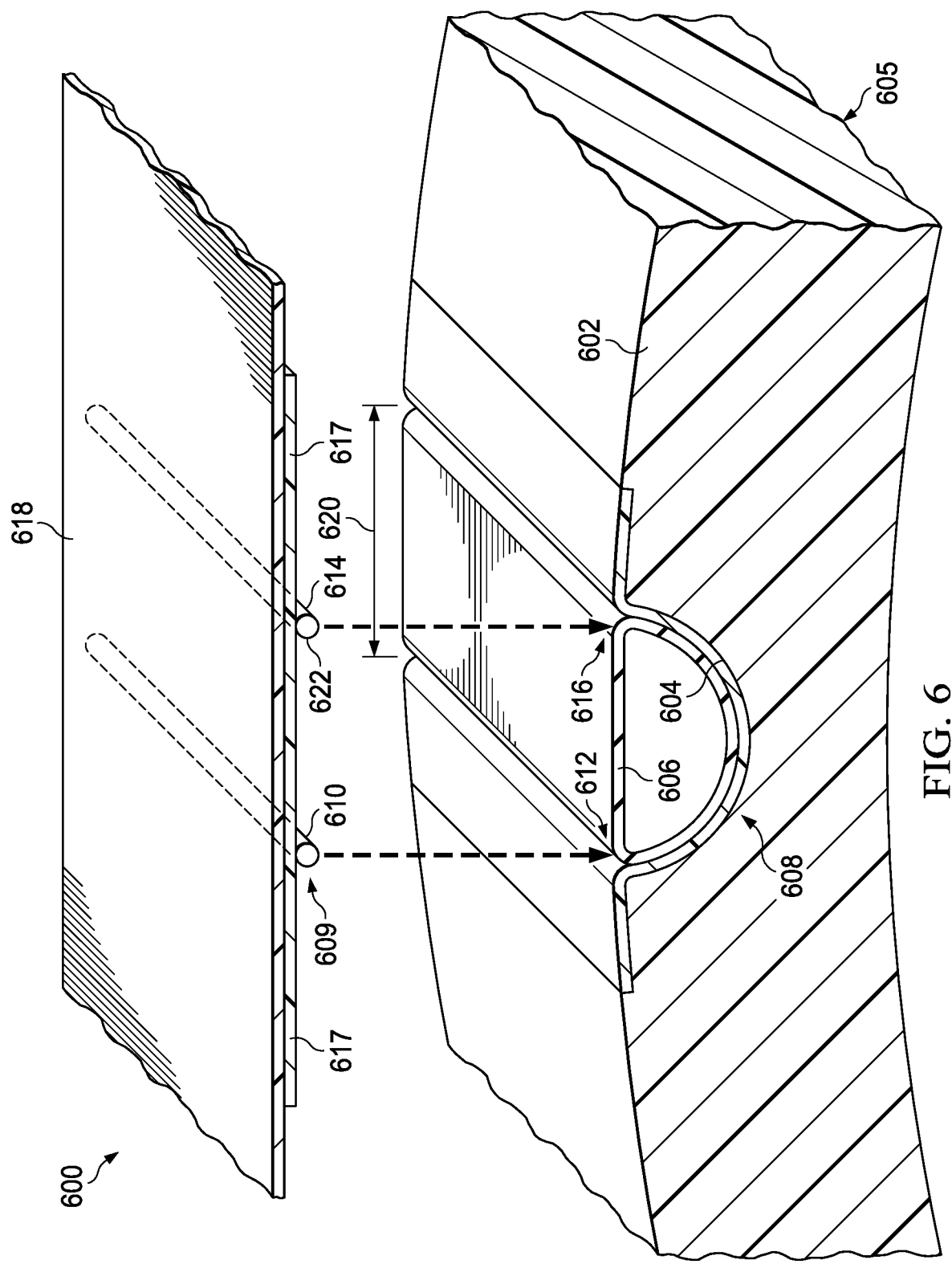
FIG. 6 is an illustration of a perspective view of a radius filler kit being positioned relative to a stringer in accordance with an illustrative embodiment.

Turning now to FIG. 6, an illustration of a perspective view of a radius filler kit being positioned relative to a stringer is depicted in accordance with an illustrative embodiment. Radius filler kit 600 is a physical implementation of radius filler kit 100 of FIG. 1. Radius filler kit 600 is positioned relative to stringer 602. Stringer 602 is a physical implementation of stringer 124 of FIG. 1.

As depicted, stringer 602 is within channel 604 of stiffener forming tool 605. Stiffener forming tool 605 may be a physical implementation of stiffener forming tool 180 of FIG. 1. Stiffener forming tool 605 may be a portion of stiffener forming tool 300 of FIG. 3. When stiffener forming tool 605 is a portion of stiffener forming tool 300, stringer 602 has been placed in one of plurality of channels 302 of stiffener forming tool 300 of FIG. 3.

Bladder 606 is positioned within stringer 602. Bladder 606 maintains shape 608 of stringer 602 during curing.

Radius filler kit 600 is positioned relative to stringer 602. Radius filler kit 600 comprises plurality of segments of radius filler 609. Plurality of segments of radius filler 609 forms first section of radius filler 610 and second section of radius filler 614. Radius filler kit 600 is positioned such that first section of radius filler 610 will be placed into first gap 612 of stringer 602. Radius filler kit 600 is positioned such that second section of radius filler 614 will be placed into second gap 616 of stringer 602.

Radius filler kit 600 further comprises ply 617. As depicted, ply 617 is positioned between plurality of segments of radius filler 609 and carrier material 618. After application of radius filler kit 600 to string 602, ply 617 forms an "inner mold line (IML) ply" of a resulting stiffener.

As depicted, radius filler kit 600 is being carried on carrier material 618. Carrier material 618 is formed of any desirable material. In some illustrative examples, carrier material 618 is a vacuum bag material. In some illustrative examples, carrier material 618 is a portion of a radius filler placement system, such as radius filler placement system 154 of FIG. 1.

Radius filler kit 600 is applied to stringer 602 by lowering carrier material 618 towards stringer 602. Radius filler kit 600 is lowered such that plurality of segments of radius filler 609 is applied to first gap 612 and second gap 616 of stringer 602. First gap 612 and second gap 616 are separated by distance 620. First section of radius filler 610 and second section of radius filler 614 on carrier material 618 are separated by distance 620 prior to application to stringer 602.

Plurality of segments of radius filler 609 is applied to first gap 612 and second gap 616 simultaneously. Radius filler kit 600, including first section of radius filler 610 and second section of radius filler 614, is lowered such that first section of radius filler 610 is applied to first gap 612 and second section of radius filler 614 is applied to second gap 616 simultaneously.

Carrier material 618 and radius filler kit 600 are lowered towards stiffener forming tool 605 to apply radius filler kit 600 to stringer 602. In some illustrative examples, carrier material 618 holding radius filler kit 600 may be transported in a substantially planar state. In other illustrative examples, carrier material 618 holding radius filler kit 600 may be transported in a rolled state. In some illustrative examples, applying plurality of segments of radius filler 609 comprises unrolling carrier material 618 and radius filler kit 600. In other illustrative examples, carrier material 618 and radius filler kit 600 are unrolled after transportation but prior to application of radius filler kit 600 to stringer 602.

After applying radius filler kit 600 to stringer 602, a compression force is applied to create a greater adhesive force between radius filler kit 600 and stringer 602 than between radius filler kit 600 and carrier material 618. When the adhesive force between radius filler kit 600 and stringer 602 is greater than the adhesive force between radius filler kit 600 and carrier material 618, carrier material 618 may be removed from radius filler kit 600. In some illustrative examples, carrier material 618 is pulled or peeled off of radius filler kit 600. In some illustrative examples, carrier material 618 is rolled onto a manifold to remove carrier material 618 from radius filler kit 600. In some illustrative examples, carrier material 618 is removed from radius filler kit 600 as a whole. When carrier material 618 is removed from radius filler kit 600, first section of radius filler 610 remains in first gap 612 and second section of radius filler 614 remains in second gap 616.

In some illustrative examples, carrier material 618 is a vacuum bag material. When carrier material 618 is a vacuum bag material, the vacuum bag material may be sealed to stiffener forming tool 605 holding stringer 602 after applying radius filler kit 600 to stringer 602. In these illustrative examples, a vacuum may be applied to plurality of segments of radius filler 609 and stringer 602 to apply compression force to plurality of segments of radius filler 609. After applying the vacuum, carrier material 618 is removed.

In some illustrative examples, plurality of segments of radius filler 609 and stringer 602 may be cured prior to removing carrier material 618. In other illustrative examples, plurality of segments of radius filler 609 and stringer 602 are cured after removing carrier material 618. For example, plurality of segments of radius filler 609 and stringer 602 may be components of a larger composite layup. In this example, after positioning the other components of the larger composite layup, the composite layup is co-cured as a whole. For example, plurality of segments of radius filler 609 and stringer 602 may be components of a barrel section of an aircraft. In this illustrative example, the barrel section may be cured after a composite skin is placed over plurality of segments of radius filler 609 and stringer 602.

The illustration of radius filler kit 600, carrier material 618, and stiffener forming tool 605 in FIG. 6 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Channel 604 may be a portion of a stiffener forming tool having any desirable size, shape, or quantity of channels. Channel 604 may have any desirable size or shape. Radius filler kit 600 is depicted as having two radius filler sections. In other illustrative examples, radius filler kit 600 may have greater than two radius filler sections.

As another example, first section of radius filler 610 and second section of radius filler 614 have domed cross-sectional shape 622. In other non-depicted illustrative examples, first section of radius filler 610 and second section of radius filler 614 may have other desirable shapes. For example, first section of radius filler 610 and second section of radius filler 614 may have a triangular cross-sectional shape.

Radius filler kit 600 may be positioned and applied to stringer 604 in any desirable fashion such as manually, in an automated fashion, or some combination of the two. For example, carrier material 618 may be maneuvered manually or using automated equipment. In some illustrative examples, a compression force is applied to radius filler kit 600 manually. In some illustrative examples, a compression force is applied to radius filler kit 600 in an automated fashion.

Figure 7:
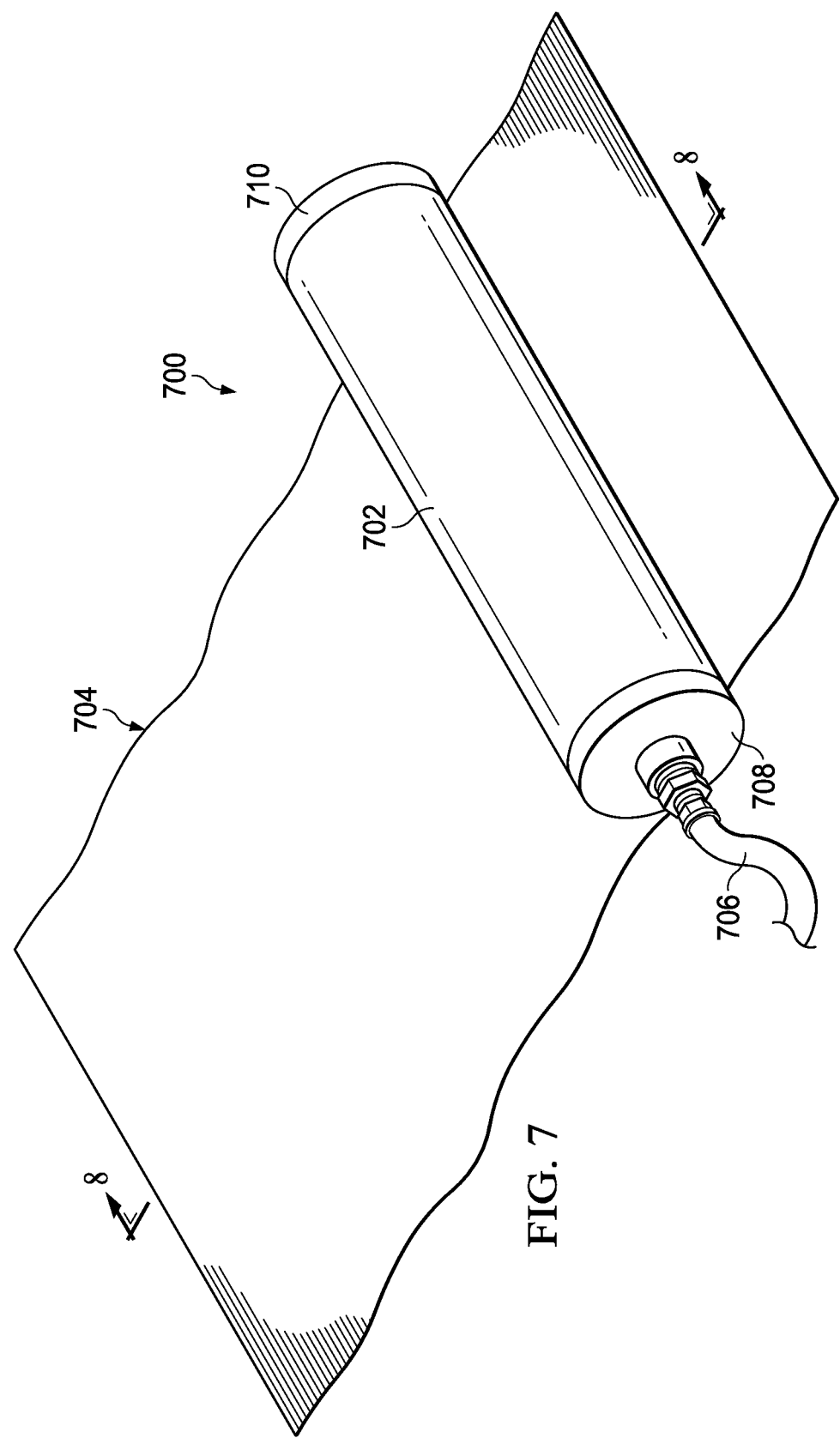
FIG. 7 is an illustration of an isometric view of a radius filler placement system having a manifold in accordance with an illustrative embodiment.

Turning now to FIG. 7, an illustration of an isometric view of a radius filler placement system having a manifold is depicted in accordance with an illustrative embodiment. Radius filler placement system 700 is a physical implementation of radius filler placement system 154 of FIG. 1. In some illustrative examples, carrier material 418 of FIG. 4 is a component of radius filler placement system 700 of FIG.

7. In some illustrative examples, carrier material 618 of FIG. 6 is a component of radius filler placement system 700 of FIG. 7.

Radius filler placement system 700 has roller manifold 702 and carrier material 704. Carrier material 704 is bonded to roller manifold 702. Vacuum is supplied to a vacuum chamber (not depicted) of roller manifold 702 through vacuum supply 706 connected to first end 708 of roller manifold 702. Second end 710 of roller manifold 702 is sealed to create the vacuum chamber (not depicted) inside roller manifold 702.

Carrier material 704 may be used to lift a radius filler kit from a radius filler forming tool, such as lifting radius filler kit 100 from radius filler forming tool 112 of FIG. 1. Carrier material 704 may be used to lift a radius filler kit from at least one of radius filler forming tool 200 of FIG. 2 or radius filler forming tool 500 of FIG. 5.

To lift a radius filler kit, a vacuum is pulled between carrier material 704 and a radius filler forming tool. After lifting the radius filler kit, the radius filler kit and carrier material 704 may be wrapped in a roll around roller manifold 702. A radius filler kit may be transported in a rolled state on radius filler placement system 700.

Carrier material 704 may also be used as a backing paper and a compaction bag when applying a radius filler kit to a stringer. To apply a radius filler kit to a stringer, carrier material 704 and the radius filler kit are unrolled from roller manifold 702. Afterwards, a vacuum is pulled beneath carrier material 704 to compact the radius filler kit and remove the radius filler kit from carrier material 704.

Radius filler placement system 700 may reduce at least one of manufacturing time or manufacturing cost. Radius filler placement system 700 is reusable. Further, radius filler placement system 700 may replace disposable manufacturing materials. For example, radius filler placement system 700 may replace disposable vacuum bagging materials. Radius filler placement system 700 may reduce manufacturing waste.

Radius filler placement system 700 may be operated in any desirable manner. Radius filler placement system 700 may be placed and operated manually, in an automated fashion, or some combination of the two. In some illustrative examples, radius filler placement system 700 is positioned manually. In other illustrative examples, radius filler placement system 700 is positioned using an automated system. In some illustrative examples, radius filler placement system 700 is rolled manually. In other illustrative examples, radius filler placement system 700 is rolled in a completely or partially automated fashion.

Figure 8:
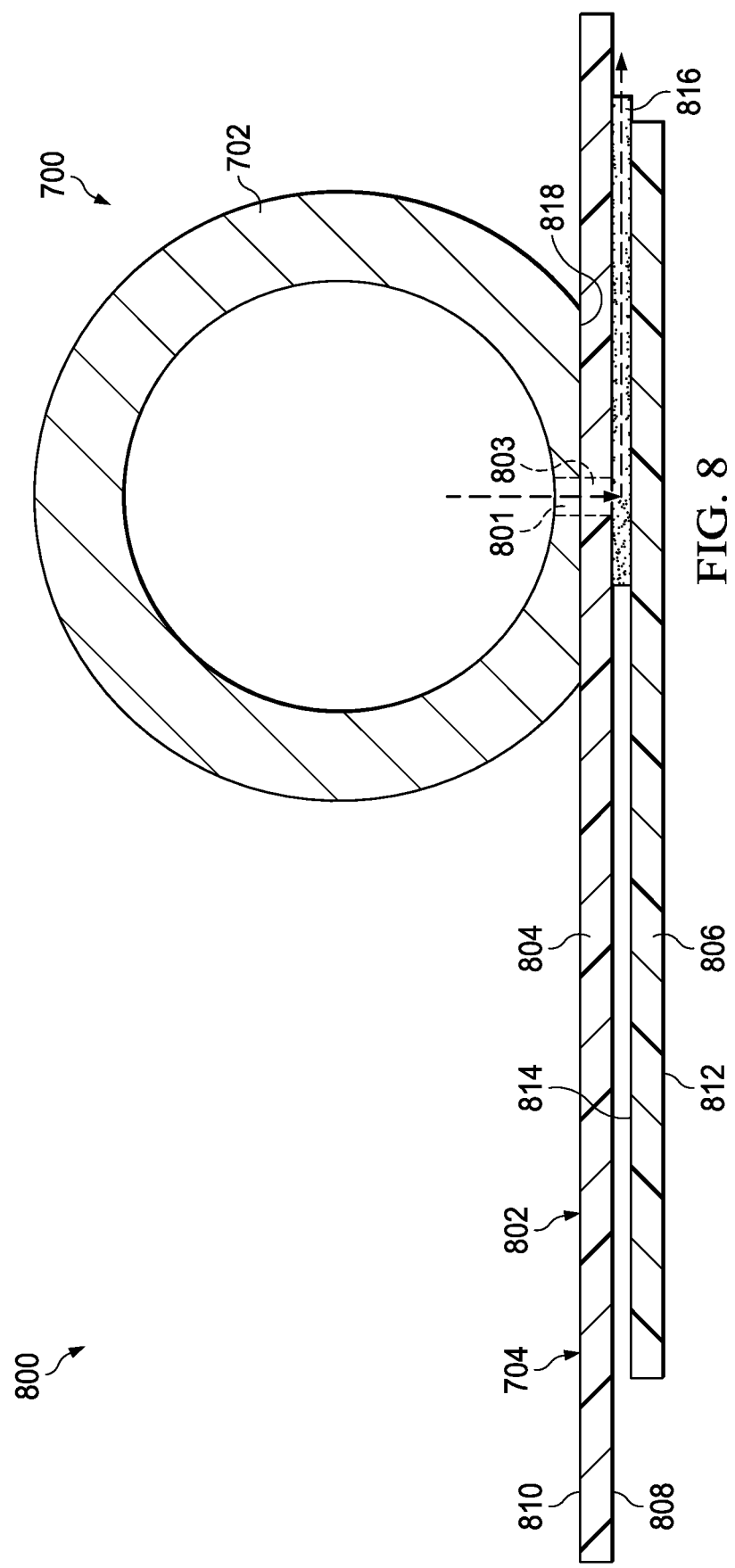
FIG. 8 is an illustration of a cross-sectional view of a radius filler placement system having a manifold in accordance with an illustrative embodiment.

Turning now to FIG. 8, an illustration of a cross-sectional view of a radius filler placement system having a manifold is depicted in accordance with an illustrative embodiment. View 800 is a cross-sectional view of radius filler placement system 700 of FIG. 7.

Radius filler placement system 700 has roller manifold 702 having vacuum opening 801. Carrier material 704 takes the form of vacuum bag material 802. Vacuum bag material 802 is connected to roller manifold 702. Vacuum bag material 802 has opening 803 interfacing with vacuum opening 801.

As depicted in view 800, carrier material 704 comprises multiple layers. As depicted, carrier material 704 is formed from first layer 804 and second layer 806. First layer 804 is formed of a vacuum bagging material. In some illustrative examples, first layer 804 is formed of a latex material. In some illustrative examples, first layer 804 may be referred to as a first latex sheet.

Vacuum bag material 802 is configured to lift a composite material. The composite material may take any desirable form. In some illustrative examples, the composite material includes a ply, such as ply 108 of FIG. 1. In some illustrative examples, the composite material includes the composite material includes plurality of segments of radius filler 132 of FIG. 1. In some illustrative examples, the composite material includes radius filler kit 100 of FIG. 1.

First layer 804 has first surface 808 and second surface 810. First surface 808 is configured to have a tackiness desirable to form a vacuum seal between first surface 808 and tooling. Second surface 810 is configured to be substantially non-adhesive. For example, second surface 810 is configured to prevent second surface 810 from sticking to roller manifold 702. As another example, second surface 810 is configured to prevent second surface 810 from sticking to a composite material of a radius filler kit.

Second layer 806 is formed of a vacuum bagging material. In some illustrative examples, second layer 806 is formed of a latex material. In some illustrative examples, second layer 806 may be referred to as a second latex sheet.

Although not depicted, second layer 806 is bonded to first layer 804. The second latex sheet is bonded to the first latex sheet in any desirable fashion. In some illustrative examples, one of epoxy, mechanical fasteners, or welding connects first layer 804 and second layer 806 in selected locations.

Second layer 806 has first surface 812 and second surface 814. First surface 812 is configured to have a tackiness desirable to adhere to a composite material of a radius filler kit. First surface 812 has a tackiness desirable to act as a carrier for the radius filler kit.

Second surface 814 is configured to be substantially non-adhesive. For example, second surface 814 is configured to prevent second surface 814 from sticking to first surface 808 of first layer 804. As another example, second surface 810 is configured to allow for distribution of vacuum between first layer 804 and second layer 806.

Breather 816 is positioned between first layer 804 and second layer 806. Breather 816 distributes vacuum to the edge of first layer 804. Breather 816 is in vacuum communication with vacuum opening 801.

In some illustrative examples, when first layer 804 and second layer 806 are a first latex sheet and a second latex sheet, each have a respective mesh surface. In some illustrative examples, second surface 810 of first layer 804 is a mesh surface. In some illustrative examples, second surface 814 of second layer 806 is a mesh surface.

As depicted, roller manifold 702 has machined surface 818. As depicted, vacuum bag material 802 is connected to machined surface 818. Machined surface 818 may ease positioning of vacuum opening 801 relative to a tool. As depicted, vacuum opening 801 is positioned within machined surface 818.

The illustrations of radius filler placement system 700 in FIGS. 7 and 8 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although not depicted, in some illustrative examples, radius filler placement system 700 may include at least one heating element. For example, vacuum bag material 802 may have integrated heating elements. As another example, roller manifold 702 may have a heating element.

Figure 9:
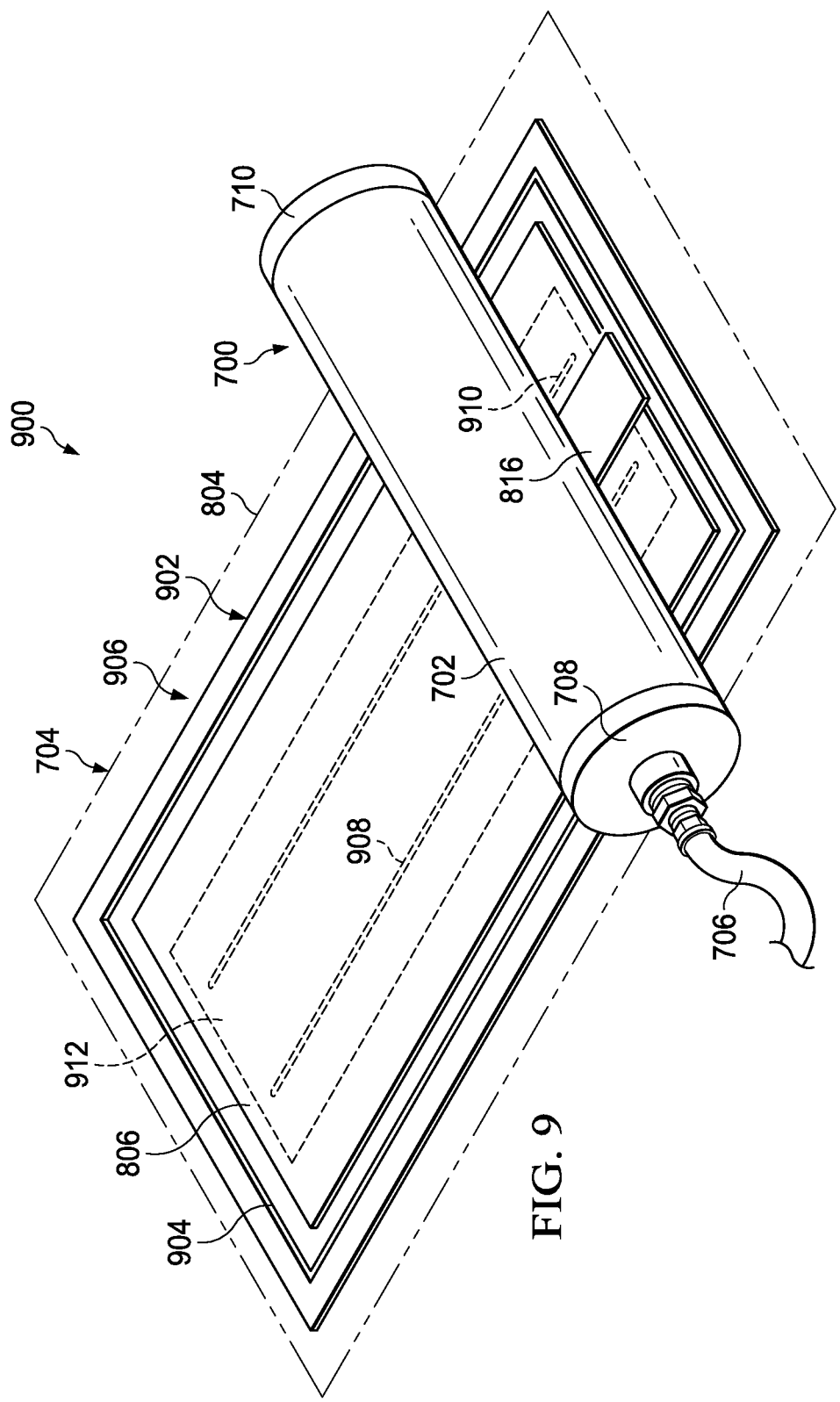
FIG. 9 is an illustration of a radius filler placement system having a manifold sealed to a radius filler forming tool in accordance with an illustrative embodiment.

Turning now to FIG. 9, an illustration of a radius filler placement system having a roller manifold sealed to a radius filler forming tool is depicted in accordance with an illustrative embodiment. In view 900, radius filler placement system 700 of FIGS. 7 and 8 is sealed to radius filler forming tool 902. In view 900, first layer 804 is transparent to more easily view radius filler forming tool 902. Radius filler forming tool 902 is a physical implementation of radius filler forming tool 112 of FIG. 1. In some illustrative examples, radius filler forming tool 902 may be radius filler forming tool 200 of FIG. 2 or radius filler forming tool 500 of FIG. 5.

As depicted, first layer 804 of carrier material 704 is sealed to vacuum channel 904 of radius filler forming tool 902. Second layer 806 extends across radius filler kit 906. In view 900, first layer 804 is transparent to more easily view second layer 806. As depicted, radius filler kit 906 has first section of radius filler 908, second section of radius filler 910, and ply 912. Each of first section of radius filler 908, second section of radius filler 910, and ply 912 are present between radius filler forming tool 902 and second layer 806. Each of first section of radius filler 908, second section of radius filler 910, and ply 912 are shown in dashed lines to depict placement below second layer 806.

After releasing vacuum from beneath carrier material 704, radius filler kit 906 is carried by second layer 806. In some illustrative examples, after releasing vacuum from beneath carrier material 704, radius filler kit 906 and carrier material 704 are rolled onto roller manifold 702.

Radius filler placement system 700 may be operated to lift radius filler kit 906 in any desirable manner. Radius filler placement system 700 may be placed and operated manually, in an automated fashion, or some combination of the two. In some illustrative examples, radius filler placement system 700 is positioned relative to radius filler kit 906 and radius filler forming tool 902 manually. In other illustrative examples, radius filler placement system 700 is positioned relative to radius filler kit 906 and radius filler forming tool 902 using an automated system. Radius filler placement system 700 may apply a compressive force using vacuum based on operator supplied or system supplied commands.

After applying a compression force, radius filler placement system 700 is used to lift radius filler kit 906 from radius filler forming tool 902. In some illustrative examples, radius filler placement system 700 is removed from radius filler forming tool 902 manually. In other illustrative examples, radius filler placement system 700 is removed from radius filler forming tool 902 using completely or partially automated equipment.

In some illustrative examples, after applying a compression force, radius filler placement system 700 is rolled. In some illustrative examples, radius filler placement system 700 holding radius filler kit 906 is rolled manually. In other illustrative examples, radius filler placement system 700 holding radius filler kit 906 is rolled in a completely or partially automated fashion.

Figure 10:
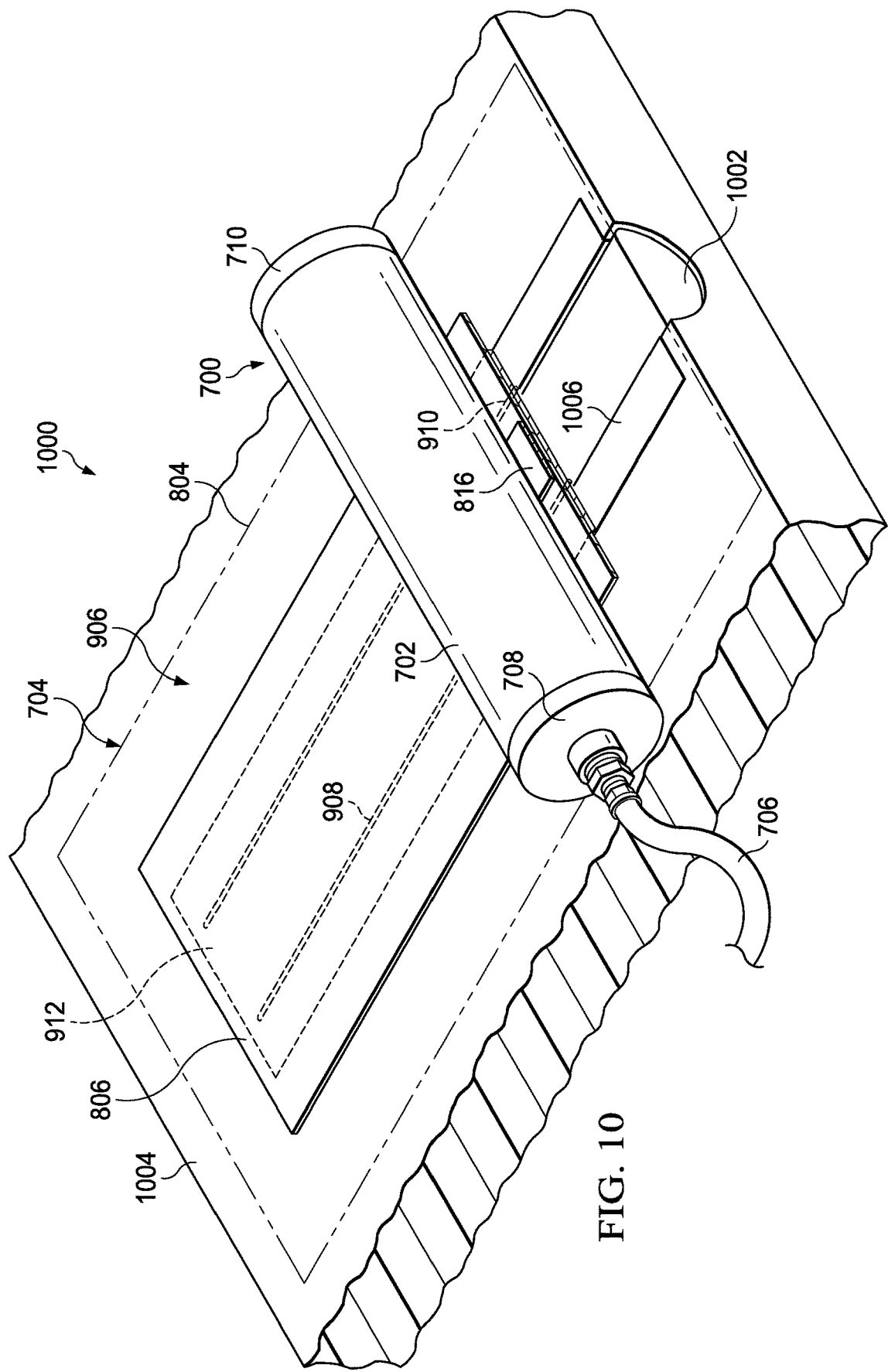
FIG. 10 is an illustration of a radius filler placement system having a manifold sealed to a tool holding a stringer in accordance with an illustrative embodiment.

Turning now to FIG. 10, an illustration of a radius filler placement system having a manifold sealed to a stiffener forming tool having a stringer is depicted in accordance with an illustrative embodiment. In view 1000, radius filler placement system 700 of FIGS. 7 and 8 is sealed to bladder 1002 and stiffener forming tool 1004. More specifically, first layer 804 of carrier material 704 is sealed to bladder 1002 and stiffener forming tool 1004. In view 1000, first layer 804 is transparent for ease of viewing stringer 1006 and bladder 1002.

More specifically, radius filler placement system 700 is sealed around stringer 1006 to receive radius filler kit 906 of FIG. 9. Stringer 1006 is positioned on stiffener forming tool 1004.

By applying vacuum beneath carrier material 704, radius filler kit 906 is pressed against stringer 1006. After releasing the vacuum from beneath carrier material 704, radius filler placement system 700 is removed from stiffener forming tool 1004. After removing radius filler placement system 700, radius filler kit 906 remains on stringer 1006.

In view 1000, a cutaway is present to depict the positioning of second layer 806 of carrier material 704 and radius filler kit 906 relative to stringer 1006. This cut-away view is present only for illustrative purposes of the positioning of second layer 806 and radius filler kit 906 and is not intended to imply limits as to the length of carrier material 704 and radius filler kit 906. For example, although a cut-away is depicted, radius filler kit 906 may extend to the edge of stringer 1006.

Radius filler placement system 700 may be operated to position and apply radius filler kit 906 in any desirable manner. Radius filler placement system 700 may be placed and operated manually, in an automated fashion, or some combination of the two. In some illustrative examples, radius filler placement system 700 is positioned relative to stringer 1006 manually. In other illustrative examples, radius filler placement system 700 is positioned relative to stringer 1006 using an automated system. Radius filler placement system 700 may apply a compressive force using vacuum based on operator supplied or system supplied commands.

After applying a compression force, radius filler placement system 700 is removed from radius filler kit 906 and stringer 1006. In some illustrative examples, radius filler placement system 700 is removed from radius filler kit 906 and stringer 1006 manually. In other illustrative examples, radius filler placement system 700 is removed from radius filler kit 906 and stringer 1006 using completely or partially automated equipment.

The different components shown in FIGS. 2-10 may be combined with components in FIG. 1, used with components in FIG. 1, or a combination of the two. Additionally, some of the components in FIGS. 2-10 may be illustrative examples of how components shown in block form in FIG. 1 can be implemented as physical structures.

Figure 11A:
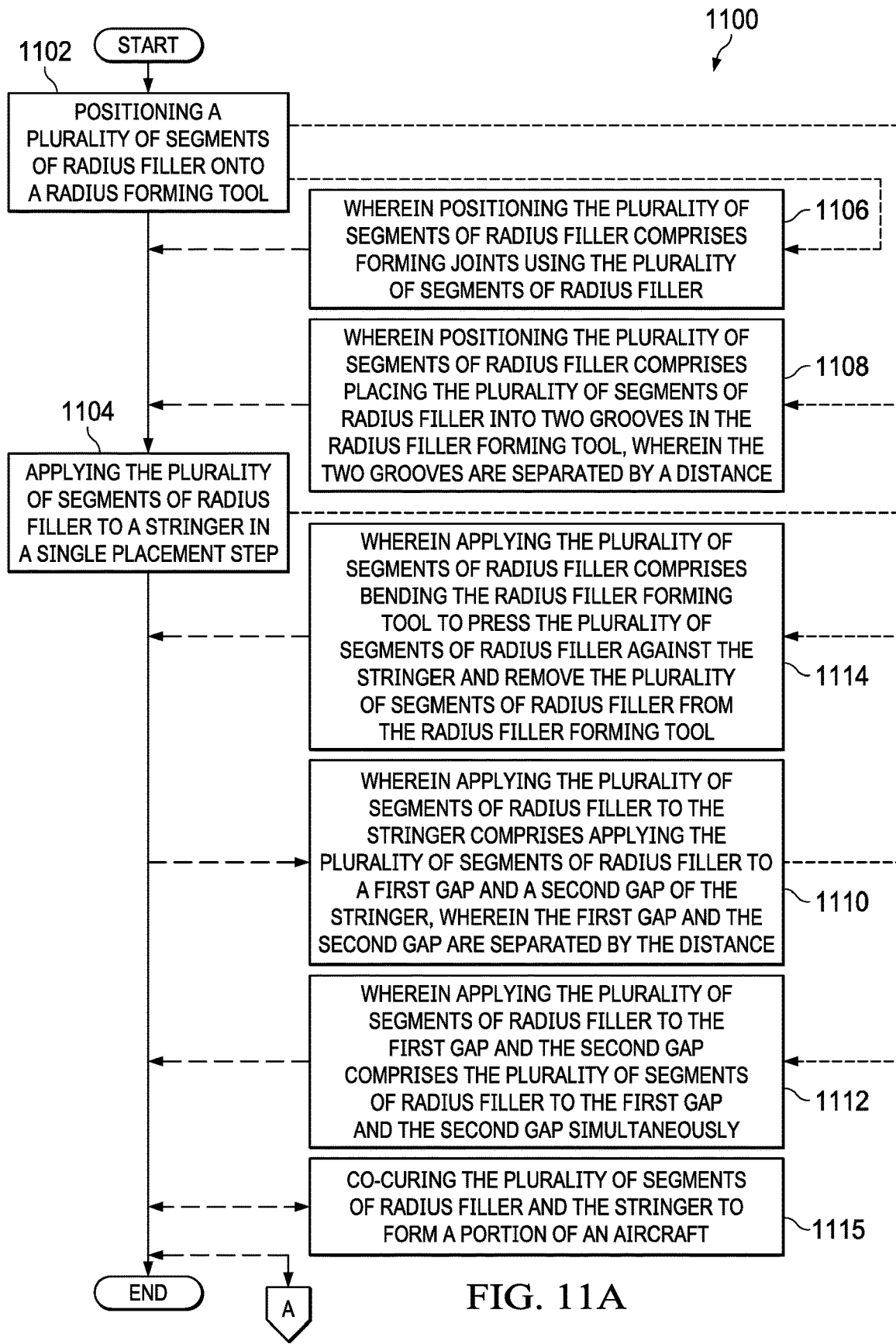
FIGS. 11A and 11B are illustrations of a flowchart of a method for applying more than one segment of a radius filler to a stringer in accordance with an illustrative embodiment.
Figure 11B:
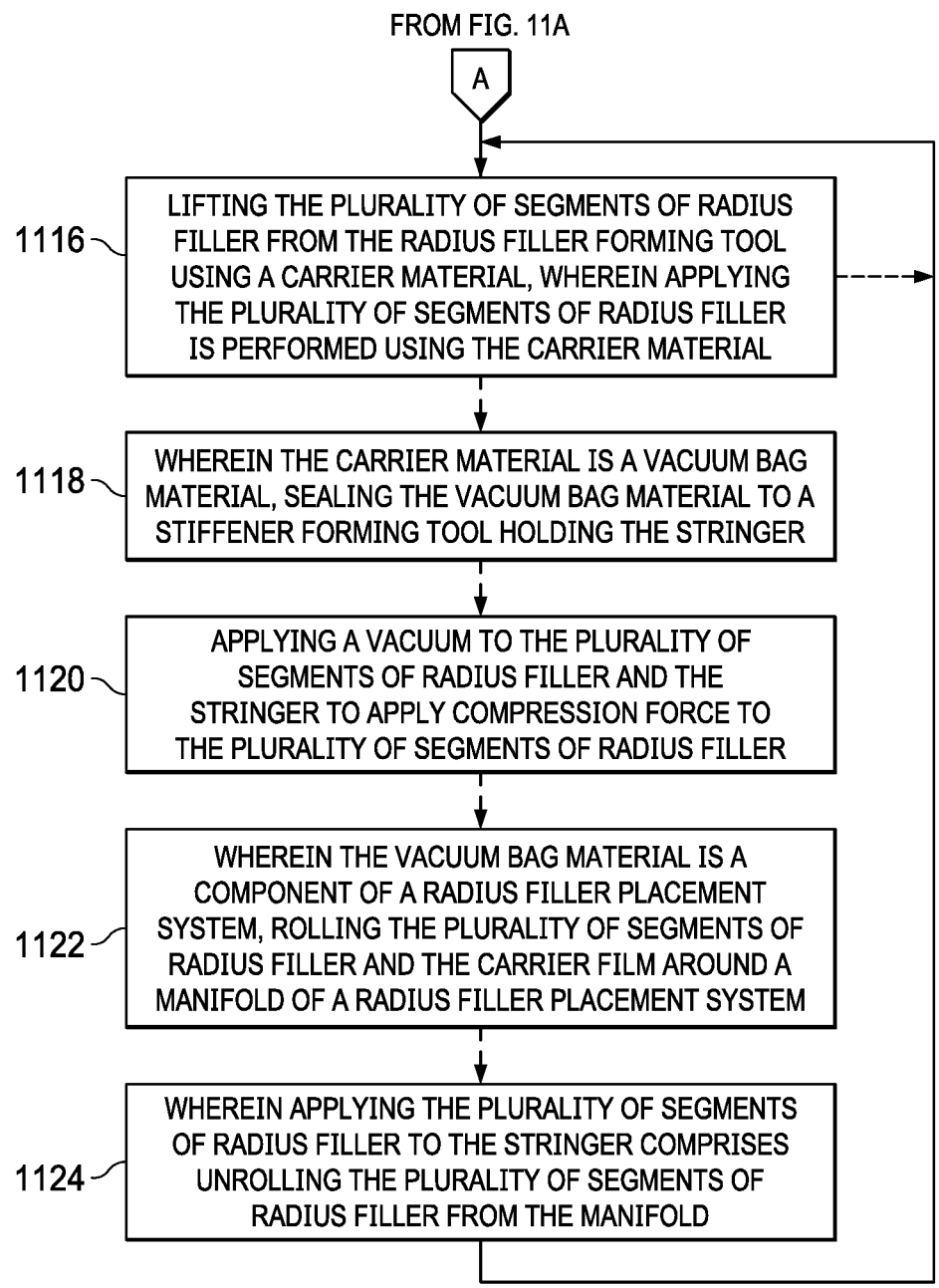

Turning now to FIGS. 11A and 11B, illustrations of flowcharts of a method for applying more than one segment of a radius filler to a stringer is depicted in accordance with an illustrative embodiment. Method 1100 may be implemented to form and apply radius filler kit 100 of FIG. 1. Method 1100 may be implemented using radius filler forming tool 112 and radius filler placement equipment 144 of FIG. 1. Method 1100 may be implemented using radius filler forming tool 200 of FIG. 2. Method 1100 may be implemented to apply a plurality of segments of radius filler to a stringer, on a stiffener forming tool, such as stiffener forming tool 300 of FIGS. 3 and 4. Method 1100 may be implemented using radius filler forming tool 500 of FIG. 5. Method 1100 may be implemented using a radius filler placement system having a roller manifold such as radius filler placement system 700 of FIGS. 7-10.

Method 1100 positions a plurality of segments of radius filler onto a radius filler forming tool (operation 1102). Method 1100 applies the plurality of segments of radius filler to a stringer in a single placement step (operation 1104). Afterwards, the method terminates.

In some illustrative examples, positioning the plurality of segments of radius filler comprises forming joints using the plurality of segments of radius filler (operation 1106). In some illustrative examples, positioning the plurality of segments of radius filler comprises forming a plurality of butt joints. In some illustrative examples, by forming joints, the plurality of segments of radius filler are formed into a smaller quantity of sections of radius filler, each section having a greater length than the provided length of the plurality of segments of radius filler. In one illustrative example, the plurality of segments of radius filler may have a manufactured length in the range of four feet to six feet. In this illustrative example, the plurality of segments of radius filler are joined to form at least one section of radius filler that is greater than the manufactured length of the plurality of segments of radius filler. For example, the at least one section of radius filler may be 10 feet long, 20 feet long, 25 feet long, or any other desirable length.

In some illustrative examples of method 1100, the plurality of segments of radius filler are joined to form more than one section of radius filler. In some illustrative examples, the resulting sections of radius filler are each greater than the manufactured length of the plurality of segments of radius filler. In some illustrative examples, the resulting sections of radius filler are all the same length.

In some illustrative examples of method 1100, positioning the plurality of segments of radius filler comprises placing the plurality of segments of radius filler into two grooves in the radius filler forming tool, wherein the two grooves are separated by a distance (operation 1108). By positioning the plurality of segments of radius filler into two grooves in the radius filler forming tool, at least two sections of radius filler are formed. By positioning the plurality of segments of radius filler into two grooves in the radius filler forming tool, a first section of radius filler and a second section of radius filler are created separated by the distance.

In some illustrative examples of method 1100, applying the plurality of segments of radius filler to the stringer comprises applying the plurality of segments to a first gap and a second gap of the stringer, wherein the first gap and the second gap are separated by the distance (operation 1110). In some illustrative examples of method 1100, applying the plurality of segments of radius filler to the first gap and the second gap comprises the plurality of segments of radius filler to the first gap and the second gap simultaneously (operation 1112).

In some illustrative examples, the plurality of segments of radius filler are applied to the stringer using the radius filler forming tool. In some illustrative examples of method 1100, applying the plurality of segments of radius filler comprises bending the radius filler forming tool to press the plurality of segments against the stringer and remove the plurality of segments of radius filler from the radius filler forming tool (operation 1114). In some illustrative examples, method 1100 further comprises co-curing the plurality of segments of radius filler and the stringer to form a portion of an aircraft (operation 1115).

In other illustrative examples, radius filler placement equipment other than the radius filler forming tool is used to apply the plurality of segments of radius filler to the stringer. In some illustrative examples, method 1100 lifts the plurality of segments of radius filler from the radius filler forming tool using a carrier material, wherein applying the plurality of segments of radius filler is performed using the carrier material (operation 1116). The carrier material takes the form of any desirable type of material.

In some illustrative examples, the carrier material is a vacuum bag material, and method 1100 seals the vacuum bag material to a stiffener forming tool holding the stringer (operation 1118). In some illustrative examples, method 1100 also applies a vacuum to the plurality of segments of radius filler and the stringer to apply compression force to the plurality of segments of radius filler (operation 1120). The compression force applied is sufficient to create an adhesion between the plurality of segments of radius filler and the stringer that is greater than the adhesion between the plurality of segments of radius filler and the vacuum bag material. After applying the vacuum to apply the compression force, the vacuum bag may be removed from the stringer, leaving the plurality of segments of radius filler in contact with the stringer.

In some illustrative examples, the vacuum bag material is a component of a radius filler placement system, and method 1100 rolls the plurality of segments of radius filler and the carrier material around a manifold of a radius filler placement system (operation 1122). In some illustrative examples, applying the plurality of segments of radius filler to the stringer comprises unrolling the plurality of segments of radius filler from the roller manifold (operation 1124).

Turning now to FIG. 12, an illustration of a flowchart of a method for using a radius filler kit is depicted in accordance with an illustrative embodiment. Method 1200 may be implemented to position and apply radius filler kit 100 of FIG. 1. Method 1200 may be implemented using radius filler placement equipment 144 of FIG. 1. Method 1200 may be implemented to apply a plurality of segments of radius filler to a stringer, on a stiffener forming tool, such as stiffener forming tool 300 of FIGS. 3 and 4. Method 1200 may be implemented using a radius filler placement system having a roller manifold such as radius filler placement system 700 of FIGS. 7-10.

Method 1200 positions a radius filler kit relative to a stringer (operation 1202). Method 1200 applies the radius filler kit to the stringer in a single placement step (operation 1204). Afterwards, the method terminates.

In some illustrative examples, the radius filler kit is transported in a rolled state. For example, the radius filler kit may be rolled on a carrier material for at least one of transportation or storage purposes. In these illustrative examples, applying the radius filler kit to the stringer comprises unrolling the radius filler kit to contact the stringer (operation 1206).

In some illustrative examples, applying the radius filler kit to the stringer comprises placing a first section of a radius filler of the radius filler kit into a first gap of the stringer and a second section of the radius filler of the radius filler kit into a second gap of the stringer (operation 1208). Further, in some of these illustrative examples, applying the radius filler kit to the stringer places the first section of the radius filler and the second section of the radius filler simultaneously (operation 1210).

In some illustrative examples, the radius filler kit is transported using a radius filler forming tool. In some of these illustrative examples, the radius filler kit may be applied to the stringer using the radius filler forming tool. In one illustrative example, applying the radius filler kit to the stringer comprises bending a radius filler forming tool to press the plurality of segments against the stringer and remove the plurality of segments of radius filler from the radius filler forming tool (operation 1212).

In some illustrative examples of method 1200, applying the radius filler kit comprises simultaneously applying a first section of radius filler, a second section of radius filler, and a ply to a stringer (operation 1214). By simultaneously applying the first section of the radius filler, the second section of the radius filler, and the ply to the stringer, the application time to the stringer is reduced.

In some illustrative examples, method 1200 applies a compression force to the radius filler kit (operation 1216). By applying a compression force to the radius filler kit, the radius filler kit is transferred to the stringer.

In some illustrative examples, method 1200 seals a vacuum bag material to a stiffener forming tool holding the stringer (operation 1218). In some illustrative examples, method 1200 then applies a vacuum to the stringer and radius filler kit below the vacuum bag material (operation 1220). In some illustrative examples, the vacuum applies a compaction force to the radius filler kit. In some illustrative examples, by applying a vacuum to the stringer and the radius filler kit, the radius filler kit is transferred from the vacuum bag material to the stringer.

In some illustrative examples, method 1200 co-cures the radius filler kit and the stringer to form a portion of an aircraft (operation 1222). The radius filler kit and the stringer may comprise any desirable portion of an aircraft that has a composite stiffener.

Turning now to FIG. 13, an illustration of a flowchart of a method for forming a radius filler kit is depicted in accordance with an illustrative embodiment. Method 1300 may be implemented using radius filler forming tool 112 of FIG. 1. Method 1300 may be implemented using radius filler forming tool 200 of FIG. 2. Method 1300 may be implemented using radius filler forming tool 500 of FIG. 5. Method 1300 may result in radius filler kit 600 of FIG. 6.

Method 1300 positions a plurality of segments of radius filler onto a radius filler forming tool (operation 1302). Method 1300 applies a ply over the plurality of segments of radius filler (operation 1304). Method 1300 applies a compression force to the plurality of segments of radius filler and the ply to form a radius filler kit (operation 1306). Afterwards, the method terminates.

In some illustrative examples, positioning the plurality of segments of radius filler comprises forming joints using the plurality of segments of radius filler (operation 1308). In some illustrative examples, positioning the plurality of segments of radius filler comprises forming a plurality of butt joints. In some illustrative examples, by forming joints, the plurality of segments of radius filler is formed into a smaller quantity of sections of radius filler, each section having a greater length than the provided length of the plurality of segments of radius filler. In one illustrative example, the plurality of segments of radius filler may have a manufactured length in the range of four feet to six feet. In this illustrative example, the plurality of segments of radius filler is joined to form at least one section of radius filler that is greater than the manufactured length of the plurality of segments of radius filler. For example, the at least one section of radius filler may be 10 feet long, 20 feet long, 25 feet long, or any other desirable length.

In some illustrative examples of method 1100, the plurality of segments of radius filler is joined to form more than one section of radius filler. In some illustrative examples, the resulting sections of radius filler are each greater than the manufactured length of the plurality of segments of radius filler. In some illustrative examples, the resulting sections of radius filler are all the same length.

In some illustrative examples, positioning the plurality of segments of radius filler comprises placing the plurality of segments of radius filler into two grooves in the radius filler forming tool, wherein the two grooves are separated by a distance (operation 1310).

In some illustrative examples, placing the plurality of segments of radius filler into the two grooves forms a first section of radius filler and a second section of radius filler (operation 1312). In some illustrative examples, method 1300 also coils the radius filler kit and a carrier material into a roll, wherein the first section of radius filler and a second section of radius filler are separated by the distance (operation 1314).

In some illustrative examples, method 1300 shapes the plurality of segments of radius filler using a number of grooves of the radius filler forming tool (operation 1316). The number of grooves of the radius filler forming tool may impart any desirable shape to plurality of segments of radius filler. In some illustrative examples, the number of grooves are configured to shape the plurality of segments of radius filler to a domed cross-sectional shape. In some illustrative examples, the number of grooves are configured to shape the plurality of segments of radius filler to a triangular cross-sectional shape.

After forming the radius filler kit, the radius filler kit will be transported for application to a stringer. In some illustrative examples, the radius filler kit will be stored prior to application to a stringer. In some illustrative examples, the radius filler kit is at least one of transported or stored on the radius filler forming tool.

In other illustrative examples, method 1300 removes the radius filler kit from the radius filler forming tool using a carrier material (operation 1318). In some illustrative examples, method 1300 coils the radius filler kit and the carrier material into a roll (operation 1320).

In some illustrative examples, the carrier material is a component of a radius filler placement system. In these illustrative examples, coiling the radius filler kit and the carrier material into a roll comprises rolling the radius filler kit and the carrier material around a manifold of a radius filler placement system (operation 1322).

In some illustrative examples, method 1300 applies the radius filler kit to a stringer (operation 1324). In some illustrative examples, method 1300 also co-cures the radius filler kit and the stringer (operation 1326).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 1100, method 1200, or method 1300 are performed. For example, each of operations 1116-1124 in FIG. 11B may be optional operations of method 1100. Additionally, operations 1106 and 1114 may be optional operations of method 1100. As another example, each of operations 1206-1220 may be optional operations of method 1200. More specifically, operations 1206 and operation 1212 may be alternative operations. As yet another example, each of operations 1308-1322 may be optional.

Figure 14:
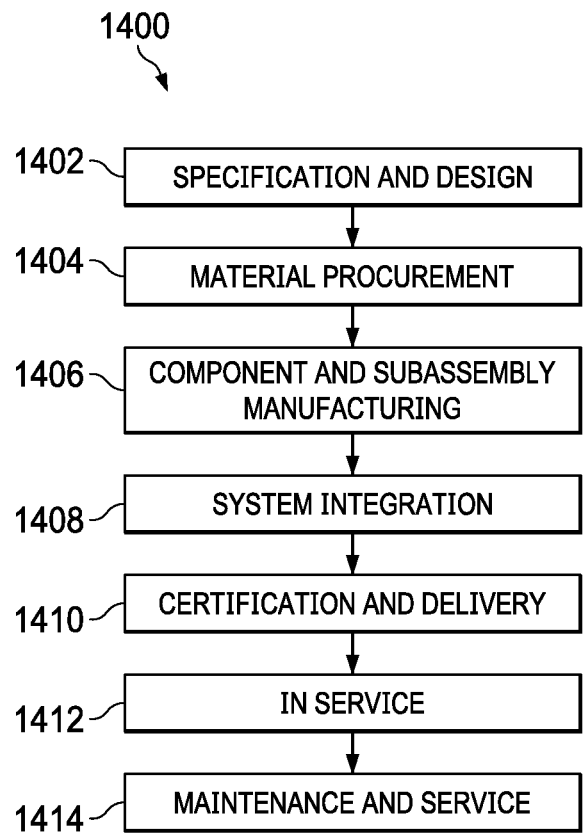
FIG. 14 is an illustration of an aircraft manufacturing and service method in the form of a block diagram in accordance with an illustrative embodiment.
Figure 15:
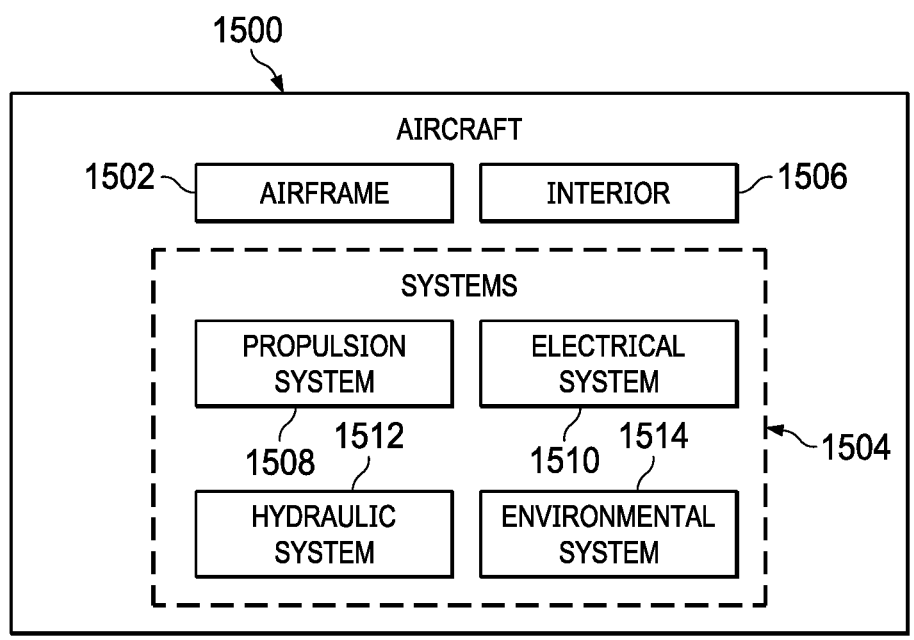
FIG. 15 is an illustration of an aircraft in the form of a block diagram in which an illustrative embodiment may be implemented.

Illustrative embodiments of the present disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During preproduction, aircraft manufacturing and service method 1400 may include specification and design 1402 of aircraft 1500 in FIG. 15 and material procurement 1404.

During production, component and subassembly manufacturing 1406 and system integration 1408 of aircraft 1500 takes place. Thereafter, aircraft 1500 may go through certification and delivery 1410 in order to be placed in service 1412. While in service 1412 by a customer, aircraft 1500 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 in FIG. 14 and may include airframe 1502 with a plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400. One or more illustrative embodiments may be used during component and subassembly manufacturing 1406, system integration 1408, or maintenance and surface 1414 of FIG. 14. For example, radius filler kit 100 of FIG. 1 may be used to fill radiuses of composite layups during component and subassembly manufacturing 1406. As another example, radius filler kit 100 of FIG. 1 may be used to fill radiuses of composite layups of replacement parts during maintenance and surface 1414 of FIG. 14. Additionally, radius filler placement system 154 of FIG. 1 may be used to place composite material, such as radius fillers, during one of component and subassembly manufacturing 1406 or maintenance and surface 1414 of FIG. 14.

Apparatuses and methods embodied herein may be employed in manufacturing at least one component of aircraft 1500. For example, radius filler kit 100 of FIG. 1 may be used to manufacture at least one of airframe 1502 or interior 1506. Further, radius filler placement system 154 of FIG. 1 may be used to place composite material, such as radius fillers or other desirable composite material, to manufacture at least one of airframe 1502 or interior 1506.

The illustrative examples provide methods and apparatuses to form and apply radius filler kits. By applying radius filler kits, stringer assembly work is developed into a feeder line activity. The application of radius filler kits enables new forming methods for at least one of lower cost or higher rate fabrication.

The illustrative examples provide methods and apparatuses for alternatives to applying radius filler portions individually to a composite layup. The illustrative examples provide methods and apparatuses for applying multiple radius filler portions in a single application step.

The illustrative examples provide an off-line tool, the radius filler forming tool, which controls parallel spacing of the radius filler. In some illustrative examples, the radius filler forming tool shapes the radius filler (noodle). The illustrative examples offer the opportunity to pre-form the noodles to an approximate shape, assemble with an inner mold line fabric ply, transport to assembly, and then aid in installation into the assembly.

The illustrative examples reduce at least one of the quantity of compaction steps, radii buckling, or installation steps. For example, by compacting the ply onto the plurality of segments of radius filler on the radius filler forming tool, a quantity of compaction steps may be reduced. As another example, by pre-shaping the plurality of segments of radius filler, wrinkling or radii buckling may be reduced. The illustrative examples may result in reduced wrinkling due to a pre-formed noodle.

The illustrative examples provide the ability to pre-shape the noodles to a general shape and to kit the radius filler (noodles) with the IML (inner mold line) ply. In some illustrative examples, the radius filler kits are rolled into a spiral for storage. In some illustrative examples, latex material of a radius filler placement system enables rolling the radius filler kits into a spiral for storage. In some illustrative examples, by placing the radius filler (noodles) on the IML ply furnish, an indexing ability is provided relative to a bladder.

The illustrative examples provide a forming plate, the radius filler forming tool, to shape the radius filler (noodle). The illustrative examples allow for cold consolidation of the radius filler (noodle) to a prepreg ply. The illustrative examples provide a radius filler forming tool that pre-aligns the noodles to a desired parallel off-set. The illustrative examples provide a ready vacuum bag layer. The illustrative examples provide a radius filler placement system that has the ability to roll into a spiral for storage or carry, and will also work as an index feature.

One key process parameter to establish is the compaction force between plies and carrier material for adherence. The compaction force enables roll up and transfer, but is below a higher compaction force between prepreg and sub-assembly during final transfer.

In one illustrative example, the same material is used as a carrier, a roller, a backing paper, and a compaction bag. More specifically, the vacuum bag material of the radius filler placement system may be used as a carrier, a roller, a backing paper, and a compaction bag for a radius filler kit. The vacuum bag of the radius filler placement system may lift the radius filler kit from the radius filler forming tool, acting as a carrier. The vacuum bag of the radius filler placement system may then roll along with the radius filler kit, to act as a roller. The vacuum bag of the radius filler placement system may then be unrolled to position the radius filler kit relative to a stringer, acting as a backing paper. The vacuum bag of the radius filler system may then apply a vacuum to the radius filler kit, acting as a compaction bag.

The illustrative examples may transfer and kit entire subassemblies. In some illustrative examples, the subassembly is an inner mold line ply and radii fillers kit. In another illustrative example, radii fillers may be transferred and kitted.

The illustrative examples may transfer a radius filler kit in a roll form. In some illustrative examples, the radius filler kit includes a ply and a plurality of sections of radius filler.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
positioning a plurality of segments of radius filler onto a radius filler forming tool; and
applying the plurality of segments of radius filler to a stringer in a single placement step;
wherein applying the plurality of segments of radius filler comprises bending the radius filler forming tool to press the plurality of segments of radius filler against the stringer and remove the plurality of segments of radius filler from the radius filler forming tool.

2. The method of claim 1 further comprising:
co-curing the plurality of segments of radius filler and the stringer to form a portion of an aircraft.

3. The method of claim 1 further comprising:
lifting the plurality of segments of radius filler from the radius filler forming tool using a carrier material, wherein applying the plurality of segments of radius filler is performed using the carrier material.

4. The method of claim 3, wherein the carrier material is a vacuum bag material, the method further comprising:
sealing the vacuum bag material to a stiffener forming tool holding the stringer; and
applying a vacuum to the plurality of segments of radius filler and the stringer to apply compression force to the plurality of segments of radius filler.

5. The method of claim 4, wherein the vacuum bag material is a component of a radius filler placement system, the method further comprising:
rolling the plurality of segments of radius filler and the carrier material around a roller manifold of a radius filler placement system.

6. The method of claim 5, wherein applying the plurality of segments of radius filler to the stringer comprises unrolling the plurality of segments of radius filler from the roller manifold.

7. The method of claim 1, wherein positioning the plurality of segments of radius filler comprises forming joints using the plurality of segments of radius filler.

8. The method of claim 1, wherein positioning the plurality of segments of radius filler comprises placing the plurality of segments of radius filler into two grooves in the radius filler forming tool, wherein the two grooves are separated by a distance.

9. The method of claim 8, wherein applying the plurality of segments of radius filler to the stringer comprises applying the plurality of segments of radius filler to a first gap and a second gap of the stringer, wherein the first gap and the second gap are separated by the distance.

10. The method of claim 9, wherein applying the plurality of segments of radius filler to the first gap and the second gap comprises the plurality of segments of radius filler to the first gap and the second gap simultaneously.

11. A method comprising:
positioning a radius filler kit relative to a stringer; and
applying the radius filler kit to the stringer in a single placement step;
wherein applying the radius filler kit to the stringer comprises bending a radius filler forming tool to press a plurality of segments of radius filler of the radius filler kit against the stringer and remove the plurality of segments of radius filler from the radius filler forming tool.

12. The method of claim 11 further comprising:
co-curing the radius filler kit and the stringer to form a portion of an aircraft.

13. The method of claim 11 further comprising:
applying a compression force to the radius filler kit.

14. The method of claim 11 further comprising:
sealing a vacuum bag material to a stiffener forming tool holding the stringer; and
applying a vacuum to the stringer and radius filler kit below the vacuum bag material.

15. The method of claim 11, wherein applying the radius filler kit to the stringer comprises unrolling the radius filler kit to contact the stringer.

16. The method of claim 11, wherein applying the radius filler kit to the stringer comprises placing a first section of radius filler of the radius filler kit into a first gap of the stringer and a second section of radius filler of the radius filler kit into a second gap of the stringer.

17. The method of claim 16, wherein applying the radius filler kit to the stringer places the first section of radius filler and the second section of radius filler simultaneously.

18. The method of claim 11, wherein applying the radius filler kit comprises simultaneously applying a first section of radius filler, a second section of radius filler, and a ply to the stringer.

19. A method comprising:
positioning a plurality of segments of radius filler onto a radius filler forming tool; and
applying the plurality of segments of radius filler to a stringer in a single placement step;
wherein positioning the plurality of segments of radius filler comprises placing the plurality of segments of radius filler into two grooves in the radius filler forming tool, wherein the two grooves are separated by a distance.

20. The method of claim 19 further comprising:
co-curing the plurality of segments of radius filler and the stringer to form a portion of an aircraft.

21. The method of claim 19, wherein applying the plurality of segments of radius filler comprises bending the radius filler forming tool to press the plurality of segments of radius filler against the stringer and remove the plurality of segments of radius filler from the radius filler forming tool.

22. The method of claim 19 further comprising:
lifting the plurality of segments of radius filler from the radius filler forming tool using a carrier material, wherein applying the plurality of segments of radius filler is performed using the carrier material.

23. The method of claim 22, wherein the carrier material is a vacuum bag material, the method further comprising:
sealing the vacuum bag material to a stiffener forming tool holding the stringer; and
applying a vacuum to the plurality of segments of radius filler and the stringer to apply compression force to the plurality of segments of radius filler.

24. The method of claim 23, wherein the vacuum bag material is a component of a radius filler placement system, the method further comprising:
rolling the plurality of segments of radius filler and the carrier material around a roller manifold of a radius filler placement system.

25. The method of claim 24, wherein applying the plurality of segments of radius filler to the stringer comprises unrolling the plurality of segments of radius filler from the roller manifold.

26. The method of claim 19, wherein positioning the plurality of segments of radius filler comprises forming joints using the plurality of segments of radius filler.

27. The method of claim 19, wherein applying the plurality of segments of radius filler to the stringer comprises applying the plurality of segments of radius filler to a first gap and a second gap of the stringer, wherein the first gap and the second gap are separated by the distance.

28. The method of claim 27, wherein applying the plurality of segments of radius filler to the first gap and the second gap comprises the plurality of segments of radius filler to the first gap and the second gap simultaneously.

29. A method comprising:
positioning a plurality of segments of radius filler onto a radius filler forming tool;
applying the plurality of segments of radius filler to a stringer in a single placement step; and
lifting the plurality of segments of radius filler from the radius filler forming tool using a carrier material, wherein applying the plurality of segments of radius filler is performed using the carrier material;
wherein the carrier material is a vacuum bag material, the method further comprising:
sealing the vacuum bag material to a stiffener forming tool holding the stringer; and
applying a vacuum to the plurality of segments of radius filler and the stringer to apply compression force to the plurality of segments of radius filler.

30. The method of claim 29 further comprising:
co-curing the plurality of segments of radius filler and the stringer to form a portion of an aircraft.

31. The method of claim 29, wherein applying the plurality of segments of radius filler comprises bending the radius filler forming tool to press the plurality of segments of radius filler against the stringer and remove the plurality of segments of radius filler from the radius filler forming tool.

32. The method of claim 29, wherein the vacuum bag material is a component of a radius filler placement system, the method further comprising:
rolling the plurality of segments of radius filler and the carrier material around a roller manifold of a radius filler placement system.

33. The method of claim 32, wherein applying the plurality of segments of radius filler to the stringer comprises unrolling the plurality of segments of radius filler from the roller manifold.

34. The method of claim 29, wherein positioning the plurality of segments of radius filler comprises forming joints using the plurality of segments of radius filler.

35. The method of claim 29, wherein positioning the plurality of segments of radius filler comprises placing the plurality of segments of radius filler into two grooves in the radius filler forming tool, wherein the two grooves are separated by a distance.

36. The method of claim 35, wherein applying the plurality of segments of radius filler to the stringer comprises applying the plurality of segments of radius filler to a first gap and a second gap of the stringer, wherein the first gap and the second gap are separated by the distance.

37. The method of claim 36, wherein applying the plurality of segments of radius filler to the first gap and the second gap comprises the plurality of segments of radius filler to the first gap and the second gap simultaneously.

* * * * *